United States Patent
Ichimura

(10) Patent No.: US 11,012,736 B2
(45) Date of Patent: May 18, 2021

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Gen Ichimura, Tokyo (JP)

(73) Assignee: Sony Corporation, Tokyo (JP)

(*) Notice: Subject to any disclaimer, the term of this patent is extended or adjusted under 35 U.S.C. 154(b) by 97 days.

(21) Appl. No.: 15/511,636

(22) PCT Filed: Sep. 16, 2015

(86) PCT No.: PCT/JP2015/076240
§ 371 (c)(1),
(2) Date: Mar. 15, 2017

(87) PCT Pub. No.: WO2016/052185
PCT Pub. Date: Apr. 7, 2016

(65) Prior Publication Data
US 2017/0289613 A1  Oct. 5, 2017

(30) Foreign Application Priority Data
Sep. 29, 2014 (JP) .............................. JP2014-199483

(51) Int. Cl.
| | | |
|---|---|---|
| H04N 21/439 | (2011.01) | |
| G09G 5/00 | (2006.01) | |
| H04N 21/436 | (2011.01) | |
| G11B 20/10 | (2006.01) | |
| H04N 21/41 | (2011.01) | |
| H04N 21/4363 | (2011.01) | |
| H04S 5/00 | (2006.01) | |
| H04S 5/02 | (2006.01) | |

(52) U.S. Cl.
CPC ......... *H04N 21/4398* (2013.01); *G11B 20/10* (2013.01); *H04N 21/4135* (2013.01);
(Continued)

(58) Field of Classification Search
CPC ........... H04N 21/4398; H04N 21/4135; H04N 21/436; H04N 21/43635; G11B 20/10;
(Continued)

(56) References Cited

U.S. PATENT DOCUMENTS

| | | | | |
|---|---|---|---|---|
| 2002/0147594 A1* | 10/2002 | Duncan | ................... | G10L 19/18 704/500 |
| 2006/0077778 A1* | 4/2006 | Tatum | .................. | G02B 6/4246 369/44.11 |

(Continued)

FOREIGN PATENT DOCUMENTS

| | | |
|---|---|---|
| JP | 2008-005193 A | 1/2008 |
| JP | 2009-130606 A | 6/2009 |

(Continued)

OTHER PUBLICATIONS

HDMI Forum, High-Definition Multimedia Interface Specification Version 2.0, Sep. 4, 2013, HDMI Forum, Version 2.0, pp. 1-245.*

*Primary Examiner* — Davetta W Goins
*Assistant Examiner* — Daniel R Sellers
(74) *Attorney, Agent, or Firm* — Chip Law Group

(57) ABSTRACT

To enable multichannel audio data to be transmitted favorably. Multichannel audio data of a predetermined number of channels is acquired. The multichannel audio data has a sampling frequency corresponding to the predetermined number of channels. Audio data of the respective channels configuring the multichannel audio data are sequentially transmitted to a reception side via a predetermined transmission channel for each unit audio data. Information indicating the sampling frequency is added to the transmission audio data.

16 Claims, 25 Drawing Sheets

(52) U.S. Cl.
CPC ..... *H04N 21/436* (2013.01); *H04N 21/43635* (2013.01); *H04S 5/005* (2013.01); *G09G 5/006* (2013.01); *H04R 2205/024* (2013.01); *H04S 5/02* (2013.01); *H04S 2400/01* (2013.01); *H04S 2400/03* (2013.01)

(58) Field of Classification Search
CPC ........ H04S 5/005; H04S 5/02; H04S 2400/01; H04S 2400/03; G09G 5/006; H04R 2205/024
See application file for complete search history.

(56) References Cited

U.S. PATENT DOCUMENTS

| | | | | |
|---|---|---|---|---|
| 2007/0299983 | A1* | 12/2007 | Brothers | H04N 21/2368 709/231 |
| 2008/0043823 | A1* | 2/2008 | Lin | H04L 25/4904 375/220 |
| 2008/0080596 | A1* | 4/2008 | Inoue | G06F 3/14 375/211 |
| 2009/0292377 | A1* | 11/2009 | Yamasaki | H04S 3/02 700/94 |
| 2011/0142245 | A1* | 6/2011 | Toba | G11B 20/10527 381/22 |
| 2012/0044985 | A1* | 2/2012 | Tao | H04N 21/234363 375/240.01 |
| 2013/0160050 | A1* | 6/2013 | Halgas, Jr. | H04N 21/4751 725/34 |
| 2013/0223632 | A1* | 8/2013 | Kim | H04R 5/00 381/17 |

FOREIGN PATENT DOCUMENTS

| | | |
|---|---|---|
| JP | 2009-278619 A | 11/2009 |
| JP | 2011-066868 A | 3/2011 |
| JP | 2011-124925 A | 6/2011 |
| JP | 2011-172156 A | 9/2011 |

* cited by examiner

HDMI pin arrangement (case of Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG.7

| Preamble | Channel coding | |
|---|---|---|
| "B" | 11101000 | 00010111 Sub-frame #1, block start |
| "M" | 11100010 | 00011101 Sub-frame #1 |
| "W" | 11100100 | 00011011 Sub-frame #2 |
| | 0 | 1 |
| | (Preceding state) | |

FIG. 13

| | 0 | 1 | 2 | 3 | 4 | 5 | 6 | 7 |
|---|---|---|---|---|---|---|---|---|
| 0 | 0 "For consumer use" | 1 "Linear PCM" | | | | | 6 Mode "0" | 7 |
| 1 | | | | | | | | |
| 2 | | | | | | | | |
| 3 | 24 | 25 Sampling frequency | 26 | 27 | | | 30 Sampling frequency | 31 |
| 4 | | | | | | | | |
| 5 | | | | | | | | |
| 6 | | | | | | 61 | 62 (Sampling frequency) | 63 |
| 7 | | | | | | | | |
| 8 | 64 (Sampling frequency) | 65 | 66 | 67 | | 69 (Speaker position) | 70 | 71 |
| 9 | 72 (Speaker position) | 73 | 74 | | | | | |
| ... | | | ... | | | | | |
| 21 | | | | | | | | |
| 22 | | | | | | | | |
| 23 | | | | | | | | 191 |

FIG. 14

| Mode 0 Chanel status format | | Sampling frequency |
|---|---|---|
| Byte 3 Bit 24 - 27 | Byte 3 Bit 30 - 31 | |
| 0000b | (00b) | 44.1 kHz |
| 1000b | (00b) | Sampling frequency not indicated |
| 0100b | (00b) | 48 kHz |
| 1100b | (00b) | 32 kHz |
| 0010b | (00b) | 22.05 kHz |
| 1010b | 00b | 384 kHz |
| | 10b | 1536 kHz |
| | 01b | reserved |
| | 11b | 1024 kHz |
| 0110b | (00b) | 24 kHz |
| 1110b | 00b – 11b | reserved |
| 0001b | (00b) | 88.2 kHz |
| 1001b | (00b) | 768 kHz |
| 0101b | (00b) | 96 kHz |
| 1101b | 00b | 64 kHz |
| | 01b | 128 kHz |
| | 10b | 256 kHz |
| | 11b | 512 kHz |
| 0011b | (00b) | 176.4 kHz |
| 1011b | 00b | 352.8 kHz |
| | 01b | 705.6 kHz |
| | 10b | 1411.2 kHz |
| | 11b | reserved |
| 0111b | (00b) | 192 kHz |
| 1111b | 00b – 11b | reserved |

| Number of channels | Sampling frequency per channel | Sampling frequency in Channel Status bit | Byte 3 Bit 24 – 27 | Bit 30 – 31 |
|---|---|---|---|---|
| 6 (5, 1) | 48kHz | 144kHz | 1110b | 00b |
| 12 (10, 2) | 48kHz | 288kHz | 1110b | 01b |
| 24 (22, 2) | 48kHz | 576kHz | 1110b | 10b |

FIG. 16(b)

| Number of channels | Byte 3 Bit 24 – 27 | Bit 30 – 31 | Bit 61–66 |
|---|---|---|---|
| 6 (5, 1) | 1110b | 00b | 000000b |
| 12 (10, 2) | 1110b | 00b | 000001b |
| 24 (22, 2) | 1110b | 00b | 000010b |

| Bit 67-74 | Channel number | | | | | | | | |
|---|---|---|---|---|---|---|---|---|---|
| | 1 | 2 | 3 | 4 | 5 | 6 | 7 | ... | 32 |
| 00000000b | - | - | - | - | - | - | - | ... | - |
| 00000001b | FL | FR | - | - | LS | RS | - | ... | - |
| 00000010b | FL | FR | FC | - | LS | RS | - | ... | - |
| 00000011b | FL | FR | FR | FC | LS | LS | - | ... | - |
| 00000011b | FL | FR | FR | LFE1 | LS | LS | - | ... | - |
| 00000100b | FL | FR | FC | LFE1 | LS | LS | - | ... | - |
| 00000101b | FL | FR | FC | LFE1 | LS | LS | - | ... | - |
| 00000110b | FL | FR | FC | LFE1 | TpFL | TpFR | - | ... | - |
| ⋮ | | | | | | | | | |

| | 1 | 2 | 3 | 4 | 5 | 6 | 7 | 8 | ... | 32 |
|---|---|---|---|---|---|---|---|---|---|---|
| 00010000b | FL | FR | FC | LFE1 | LS | RS | TpFL | TpFR | ... | - |

| | 1 | 2 | 3 | 4 | 5 | 6 | 7 | 8 | 9 | 10 | 11 | 12 | ... | 32 |
|---|---|---|---|---|---|---|---|---|---|---|---|---|---|---|
| 00100000b | FL | FR | FC | LFE1 | LS | RS | TpFL | TpFR | TpFC | BL | BR | LFE2 | ... | - |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | ... | 32 |
|---|---|---|---|---|---|---|---|---|---|---|---|---|---|---|---|---|---|---|---|---|---|---|---|---|---|---|
| 01000000b | FL | FR | FC | LFE1 | BL | BR | FLc | FRc | BC | LFE2 | SiL | SiR | TpFL | TpFR | TpFC | TpBL | TpBR | TpSiL | TpSiR | TpBC | BtFC | BtFL | BtFR | - | ... | - |

| Byte# | 7 | 6 | 5 | 4 | 3 | 2 | 1 | 0 |
|---|---|---|---|---|---|---|---|---|
| | | | | bits | | | | |
| 1 | Reserved | Audio Format Code = 0001 | | | | | Max Number of channels - 1 | |
| 2 | Reserved | 192 kHz | 176.4 kHz | 96 kHz | 88.2 kHz | 48 kHz | 44.1 kHz | 32 kHz |
| 3 | Reserved | Reserved | Reserved | Reserved | Reserved | 24 bit | 20 bit | 16 bit |

FIG. 20(b)

| Byte# | 7 | 6 | 5 | 4 | 3 | 2 | 1 | 0 |
|---|---|---|---|---|---|---|---|---|
| | | | | bits | | | | |
| 1 | Reserved | Audio Format Code = 0001 | | | | | Max Number of channels - 1 | |
| 2 | Reserved | 192 kHz | 176.4 kHz | 96 kHz | 88.2 kHz | 48 kHz | 44.1 kHz | 32 kHz |
| 3 | Reserved | Reserved | 576kHz | 288kHz | 144kHz | 24 bit | 20 bit | 16 bit |

FIG. 20(c)

| Byte# | 7 | 6 | 5 | 4 | 3 | 2 | 1 | 0 |
|---|---|---|---|---|---|---|---|---|
| | | | | bits | | | | |
| 1 | Reserved | Audio Format Code = 0001 | | | | | Reserved | |
| 2 | Reserved | Reserved | Reserved | Reserved | Reserved | 576kHz | 288 kHz | 144 kHz |
| 3 | Reserved | Reserved | Reserved | Reserved | Reserved | 24 bit | 20 bit | 16 bit |

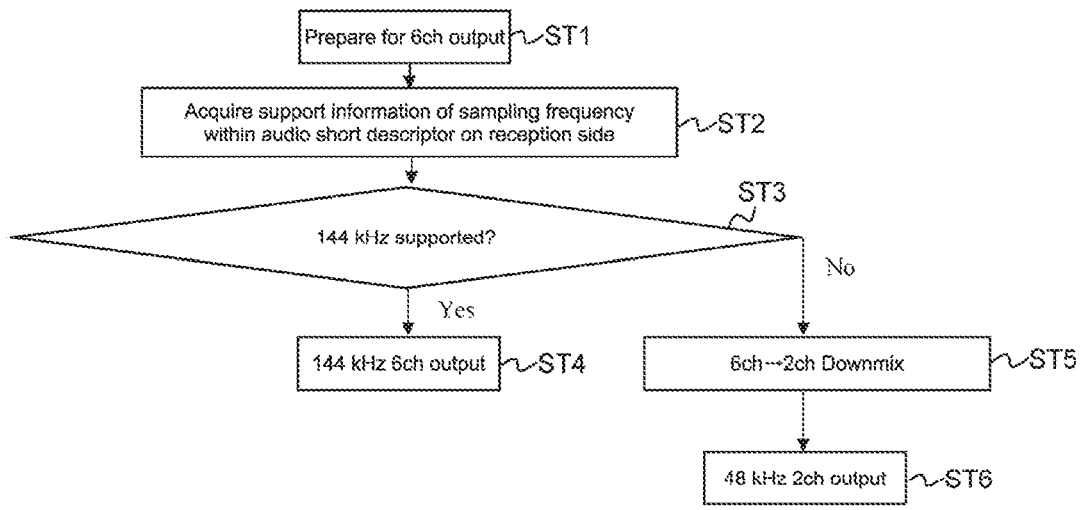
FIG.21
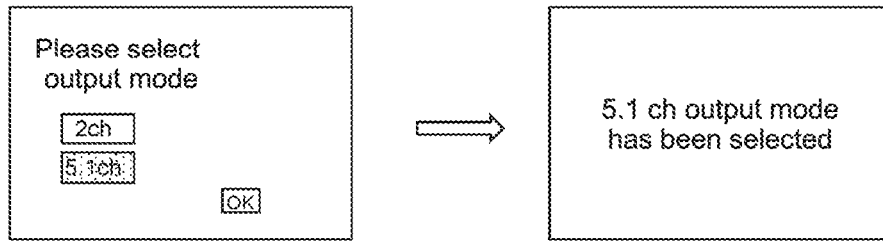
FIG. 22(a)   FIG. 22(b)
| Preceding state | 0 | 1 |
|---|---|---|
| Preamble code | Channel coding | |
| New 1 | 11011000 | 00100111 |
| New 2 | 11011010 | 00100101 |
| New 3 | 11011100 | 00101011 |
| ⋮ | | |
FIG.23

TRANSMISSION APPARATUS, TRANSMISSION METHOD, RECEPTION APPARATUS, AND RECEPTION METHOD

CROSS REFERENCE TO RELATED APPLICATIONS

This application is a U.S. National Phase of International Patent Application No. PCT/JP2015/076240 filed on Sep. 16, 2015, which claims priority benefit of Japanese Patent Application No. JP 2014-199483 filed in the Japan Patent Office on Sep. 29, 2014. Each of the above-referenced applications is hereby incorporated herein by reference in its entirety.

TECHNICAL FIELD

The present invention relates to a transmission apparatus, a transmission method, a reception apparatus, and a reception method, more particularly, to a transmission apparatus that transmits multichannel audio data, and the like.

BACKGROUND ART

For example, Patent Literature 1 includes descriptions on an IEC 60958 standard. In this standard, an LPCM (Linear Pulse Code Modulation) transmission is limited to a maximum of two channels. Specifically, transmissions of two channels are defined in an IEC 60958-1 standard, and a linear PCM is allocated to each of the channels in an IEC 60958-3 standard. It should be noted that a physical layer for a coaxial output and optical output from an RCA pin terminal, and the like are standardized in the IEC 60958-1 standard, and a physical layer equivalent to the coaxial output is standardized in HDMI ARC (High-Definition Multimedia Interface Audio Return Channel).

CITATION LIST

Patent Literature

Patent Literature 1: Japanese Patent Application Laid-open No. 2009-130606

DISCLOSURE OF INVENTION

Technical Problem

As an audio application, there are not only a 2-channel application but also a multichannel application, and data has been mapped on IEC 60958 and transmitted using an IEC 61937 standard in a compressed bit stream transmission format in the past. In recent years, quality of the multichannel audio application has improved and a lossless compression or the like has been started to be used, and thus there is a rising demand to transmit audio data in a high-quality sound multichannel linear PCM audio format.

The present technology aims at enabling multichannel audio data to be transmitted favorably.

Solution to Problem

According to a concept of the present technology, there is provided a transmission apparatus including:
a data acquisition unit that acquires multichannel audio data of a predetermined number of channels, the multichannel audio data having a sampling frequency corresponding to the predetermined number of channels;
a data transmission unit that sequentially transmits audio data of the respective channels configuring the multichannel audio data to a reception side via a predetermined transmission channel for each unit audio data; and
an information addition unit that adds information indicating the sampling frequency to the audio data transmitted by the data transmission unit.

In the present technology, the data acquisition unit acquires the multichannel audio data of the predetermined number of channels. For example, the predetermined number of channels may be 6, 12, or 24. Here, the multichannel audio data has a sampling frequency corresponding to the predetermined number of channels.

The data transmission unit sequentially transmits audio data of the respective channels configuring the multichannel audio data to the reception side via the predetermined transmission channel for each unit audio data. The information addition unit adds the information indicating the sampling frequency to the audio data transmitted by the data transmission unit. For example, the predetermined transmission channel may be a coaxial cable, an optical cable, an HDMI cable, or a display port cable.

As described above, in the present technology, the multichannel audio data of the predetermined number of channels has a sampling frequency corresponding to the number of channels, and information indicating the sampling frequency is added to the audio data transmitted by the data transmission unit. Therefore, it becomes possible for the reception side to recognize the predetermined number of channels based on the information indicating the sampling frequency and favorably process reception audio data.

It should be noted that in the present technology, for example, the information addition unit may further add information indicating a correspondence relationship between the respective channels and speaker positions to the audio data transmitted by the data transmission unit. With this configuration, the reception side can appropriately supply the audio data of the respective channels to corresponding speakers.

Further, in the present technology, for example, the transmission apparatus may further include an information acquisition unit that acquires information on a sampling frequency supported by the reception side, and the data transmission unit may transmit the multichannel audio data of the predetermined number of channels to the reception side when the sampling frequency corresponding to the predetermined number of channels is supported by the reception side. With this configuration, it becomes possible to avoid transmissions of multichannel audio data when the reception side does not support the multichannel audio data.

Further, in the present technology, for example, the transmission apparatus may further include a user interface unit that displays a channel configuration of the multichannel audio data transmitted by the data transmission unit. With this configuration, a user can easily grasp what kind of multichannel audio data is being transmitted.

According to another concept of the present technology, there is provided a reception apparatus including:
a data reception unit that sequentially receives audio data of respective channels configuring multichannel audio data of a predetermined number of channels from a transmission side via a predetermined transmission channel for each unit audio data;

the multichannel audio data having a sampling frequency corresponding to the predetermined number of channels, the audio data received by the data reception unit having information indicating the sampling frequency added thereto; and a processing unit that recognizes the predetermined number of channels based on the information indicating the sampling frequency and processes the audio data received by the data reception unit.

In the present technology, the data reception unit sequentially receives audio data of the respective channels configuring the multichannel audio data of the predetermined number of channels from the transmission side via the predetermined transmission channel for each unit audio data. For example, the predetermined number of channels may be 6, 12, or 24. For example, the predetermined transmission channel may be a coaxial cable, an optical cable, an HDMI cable, or a display port cable.

Here, the multichannel audio data has a sampling frequency corresponding to the predetermined number of channels. In addition, the information indicating the sampling frequency is added to the audio data received by the data reception unit. The processing unit recognizes the predetermined number of channels based on the information indicating the sampling frequency and processes the audio data received by the data reception unit.

As described above, in the present technology, the audio data of the respective channels configuring the multichannel audio data of the predetermined number of channels has a sampling frequency corresponding to the number of channels, and information indicating the sampling frequency is added to the audio data received by the data reception unit. Therefore, it becomes possible to recognize the predetermined number of channels based on the information indicating the sampling frequency and favorably process reception audio data.

It should be noted that in the present technology, for example, the audio data received by the reception unit may further have information indicating a correspondence relationship between the respective channels and speaker positions added thereto, and the processing unit may supply the audio data of the respective channels to corresponding speakers based on the information indicating the correspondence relationship. With this configuration, it becomes possible to appropriately supply the audio data of the respective channels to corresponding speakers.

Further, in the present technology, for example, the reception apparatus may further include an information transmission unit that transmits information on a supporting sampling frequency to the transmission side. With this configuration, the transmission side can easily grasp that the reception side is supporting multichannel audio data.

Further, in the present technology, for example, the reception apparatus may further include a user interface unit that displays a channel configuration of the multichannel audio data received by the data reception unit. With this configuration, the user can easily grasp what kind of multichannel audio data is being received.

According to another concept of the present technology, there is provided a transmission apparatus including:

a data acquisition unit that acquires multichannel audio data of a predetermined number of channels; and a data transmission unit that sequentially transmits audio data of the respective channels to a reception side via a predetermined transmission channel in a state where a preamble is added thereto for each unit audio data, a pattern of the preamble added to a head unit audio data out of consecutive unit audio data pieces of the predetermined number of channels being a specific pattern indicating a head position.

In the present technology, the data acquisition unit acquires multichannel audio data of the predetermined number of channels. The data transmission unit sequentially transmits audio data of the respective channels to the reception side via the predetermined transmission channel in a state where a preamble is added thereto for each unit audio data. A pattern of the preamble added to a head unit audio data out of consecutive unit audio data pieces of the predetermined number of channels is a specific pattern indicating a head position.

As described above, in the present technology, the pattern of the preamble added to a head unit audio data out of consecutive unit audio data pieces of the predetermined number of channels is a specific pattern indicating a head position. Therefore, the reception side can recognize the predetermined number of channels based on the preamble added to the received unit audio data and favorably process reception audio data.

It should be noted that in the present technology, for example, the transmission apparatus may further include an information addition unit that adds information indicating a correspondence relationship between the respective channels and speaker positions to the audio data transmitted by the data transmission unit. With this configuration, the reception side can appropriately supply the audio data of the respective channels to corresponding speakers.

According to another concept of the present technology, there is provided a reception apparatus including:

a data reception unit that sequentially receives audio data of respective channels configuring multichannel audio data of a predetermined number of channels from a transmission side via a predetermined transmission channel in a state where a preamble is added thereto for each unit audio data, a pattern of the preamble added to a head unit audio data out of consecutive unit audio data pieces of the predetermined number of channels being a specific pattern indicating a head position; and a processing unit that recognizes the predetermined number of channels based on the pattern of the preamble added to the unit audio data sequentially received by the data reception unit and processes the audio data received by the data reception unit.

In the present technology, the data reception unit sequentially receives the audio data of the respective channels configuring the multichannel audio data of the predetermined number of channels from the transmission side via the predetermined transmission channel in a state where a preamble is added thereto for each unit audio data. The pattern of the preamble added to a head unit audio data out of consecutive unit audio data pieces of the predetermined number of channels is a specific pattern indicating a head position. The processing unit recognizes the predetermined number of channels based on the pattern of the preamble added to the unit audio data sequentially received by the data reception unit and processes the audio data received by the data reception unit.

As described above, in the present technology, the pattern of the preamble added to a head unit audio data out of consecutive unit audio data pieces of the predetermined number of channels is a specific pattern indicating a head position. Therefore, it becomes possible to recognize the predetermined number of channels based on the preamble and favorably process reception audio data.

It should be noted that in the present technology, for example, the audio data received by the data reception unit may further have information indicating a correspondence relationship between the respective channels and speaker positions added thereto, and the processing unit may supply the audio data of the respective channels to corresponding speakers based on the information indicating the correspondence relationship. With this configuration, the audio data of the respective channels can be appropriately supplied to the corresponding speakers.

Advantageous Effects of Invention

According to the present technology, multichannel audio data can be transmitted favorably. It should be noted that the effects described in the specification are mere examples and should not be limited thereto, and additional effects may also be obtained.

BRIEF DESCRIPTION OF DRAWINGS

FIG. 7 A diagram showing an HDMI connector pin arrangement.

FIG. 13 A diagram showing channel coding of preambles in the IEC 60958 standard.

FIG. 14 A diagram schematically showing a channel status format in the IEC 60958 standard.

FIG. 15 A diagram showing a current specified state of sampling frequencies.

FIGS. 16($a$) and 16($b$) Diagrams showing a correspondence relationship between the number of channels and the sampling frequency in a case where the sampling frequency per channel is 48 kHz.

FIG. 18 A diagram showing an example of values of "bit 67-74" in a channel status and a correspondence relationship between channels respectively indicated by those values and speaker positions.

FIGS. 20($a$), 20($b$), and 20($c$) Diagrams respectively showing configuration examples of an audio short descriptor and a descriptor to be newly defined.

FIG. 21 A flowchart showing an operational example of the television receiver as an SPDIF signal transmission side.

FIGS. 22($a$) and 22($b$) Diagrams each showing an example of UI display when prompting a user to select a desired output mode.

FIG. 23 A diagram showing an example of preambles to be newly defined.

MODE FOR CARRYING OUT THE INVENTION

Hereinafter, a mode for carrying out the invention (hereinafter, referred to as "embodiment") will be described. It should be noted that descriptions will be given in the following order.
1. Embodiment
2. Modified examples 1. Embodiment

[Configuration Example of AV System]

Figure 1:
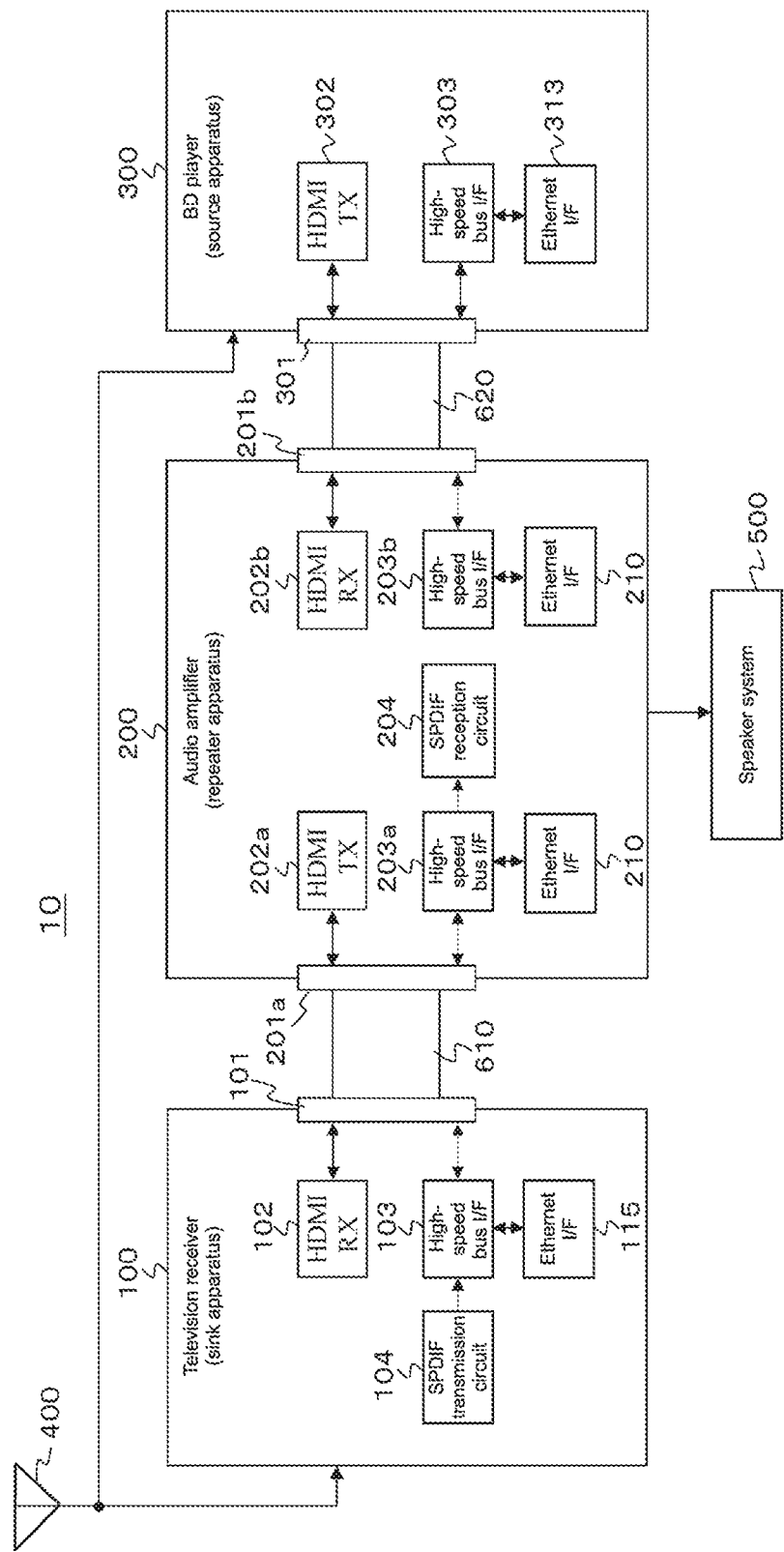
FIG. 1 A block diagram showing a configuration example of an AV system according to an embodiment.

FIG. 1 shows a configuration example of an AV system 10 according to an embodiment. The AV system 10 includes a television receiver 100 as a sink apparatus, an audio amplifier 200 as a repeater apparatus, and a BD (Blu-ray Disc) player 300 as a source apparatus. A television broadcast reception antenna 400 is connected to the television receiver 100 and the BD player 300. Moreover, a 2-channel or multichannel speaker system 500 is connected to the audio amplifier 200.

The television receiver 100 and the audio amplifier 200 are connected to each other via an HDMI cable 610. Provided in the television receiver 100 is an HDMI terminal 101 to which an HDMI reception unit (HDMI RX) 102 and a high-speed bus interface 103 configuring a communication unit are connected. Further, an HDMI terminal 201$a$ to which an HDMI transmission unit (HDMI TX) 202$a$ and a high-speed bus interface 203$a$ configuring a communication unit are connected is provided in the audio amplifier 200. One end of the HDMI cable 610 described above is connected to the HDMI terminal 101 of the television receiver 100, and the other end of the HDMI cable 610 is connected to the HDMI terminal 201$a$ of the audio amplifier 200.

Further, the audio amplifier 200 and the BD player 300 are connected to each other via an HDMI cable 620. In the audio amplifier 200, an HDMI terminal 201$b$ to which an HDMI reception unit (HDMI RX) 202$b$ and a high-speed bus interface 203$b$ configuring the communication unit are connected is provided. Furthermore, in the BD player 300, an HDMI terminal 301 to which an HDMI transmission unit (HDNI TX) 302 and a high-speed bus interface 303 configuring a communication unit are connected is provided. One end of the HDMI cable 620 described above is connected to the HDMI terminal 201*b* of the audio amplifier 200, and the other end of the HDMI cable 620 is connected to the HDMI terminal 301 of the BD player 300.

[Configuration Example of Television Receiver]

Figure 2:
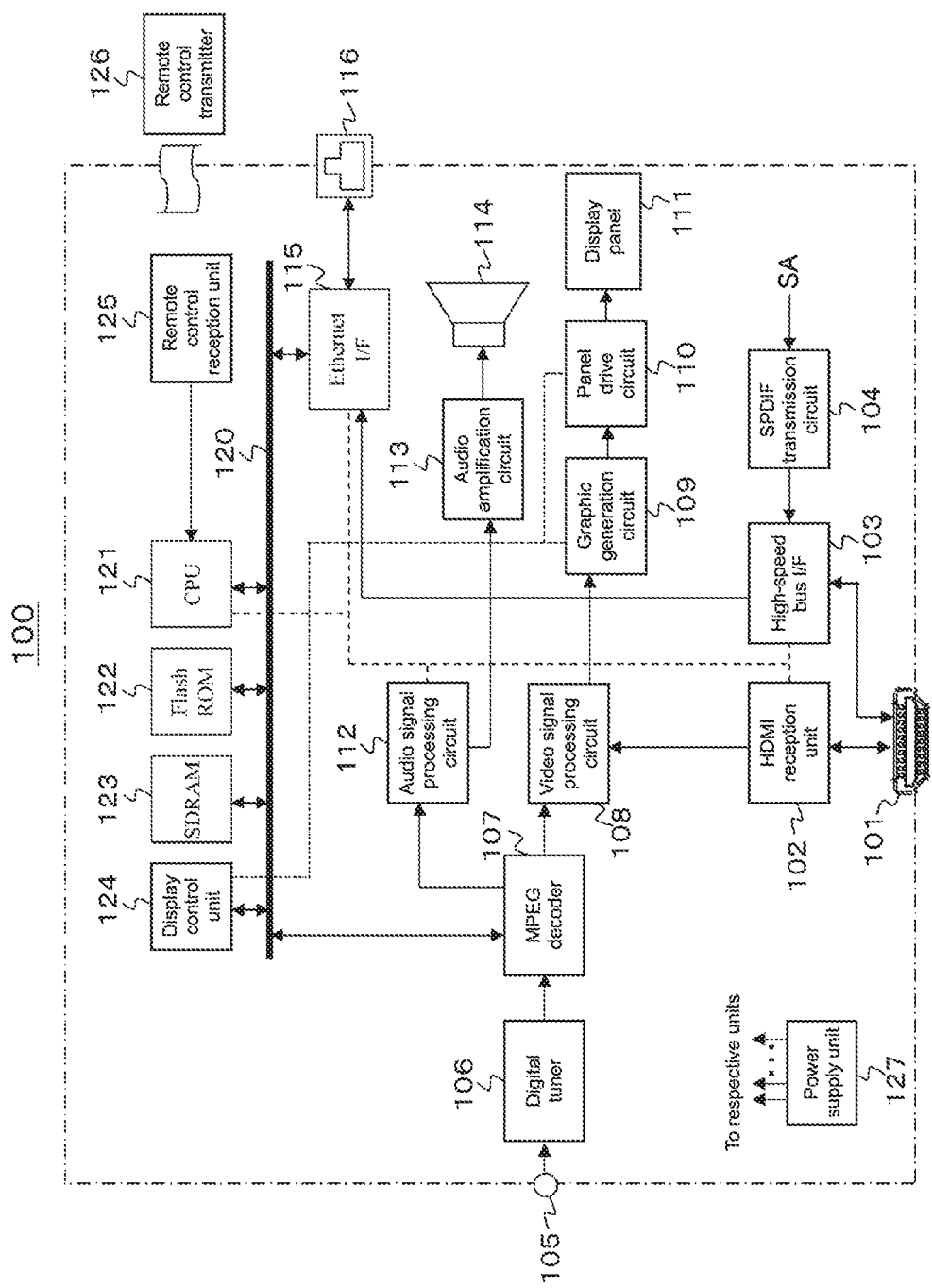
FIG. 2 A block diagram showing a configuration example of a television receiver configuring the AV system.

FIG. 2 shows a configuration example of the television receiver 100. The television receiver 100 includes the HDMI terminal 101, the HDMI reception unit 102, the high-speed bus interface 103, and the SPDIF (Sony Philips Digital Interface) transmission circuit 104. The television receiver 100 also includes an antenna terminal 105, a digital tuner 106, an MPEG decoder 107, a video signal processing circuit 108, a graphic generation circuit 109, a panel drive circuit 110, and a display panel 111.

The television receiver 100 also includes an audio signal processing circuit 112, an audio amplification circuit 113, a speaker 114, the Ethernet interface (Ethernet I/F) 115, and a network terminal 116. The television receiver 100 also includes an internal bus 120, a CPU 121, a flash ROM 122, an SDRAM (Synchronous RAM) 123, a display control unit 124, a remote control reception unit 125, a remote control transmitter 126, and a power supply unit 127. It should be noted that the "Ethernet" is a registered trademark.

The CPU 121 controls operations of the respective units of the television receiver 100. The flash ROM 122 stores control software and data. The SDRAM 123 configures a working area of the CPU 121. The CPU 121 develops software and data read out from the flash ROM 122 in the SDRAM 123 and activates the software to control the respective units of the television receiver 100.

The remote control reception unit 125 receives a remote control signal (remote control code) transmitted from the remote control transmitter 126 and supplies it to the CPU 121. The CPU 121 controls the respective units of the television receiver 100 based on the remote control code. It should be noted that although a remote control unit is illustrated as a user instruction input unit in this embodiment, the user instruction input unit may take other configurations, the examples of which include a touch panel unit to which an instruction is input by a proximity/touch operation, a mouse, a keyboard, a gesture input unit that detects an instruction input by a camera, and an audio input unit to which an instruction is input by audio.

The antenna terminal 105 is a terminal for inputting television broadcast signals received via a reception antenna (not shown). The digital tuner 106 processes the television broadcast signals input to the antenna terminal 105 and extracts a partial TS (Transport Steam) (TS packet of video data, TS packet of audio data) from a predetermined transport stream corresponding to a channel selected by a user.

The digital tuner 106 also takes out PSI/SI (Program Specific Information/Service Information) from the acquired transport stream and outputs it to the CPU 121. Processing of extracting a partial TS of an arbitrary channel from a plurality of transport streams obtained by the digital tuner 106 becomes possible by obtaining packet ID (PID) information of the arbitrary channel from PSI/SI (PAT/PMT).

The MPEG decoder 107 carries out decode processing on a video PES (Packetized Elementary Stream) packet constituted of TS packets of video data obtained by the digital tuner 106 to obtain image data. The MPEG decoder 107 also carries out decode processing on an audio PES packet constituted of TS packets of audio data obtained by the digital tuner 106 to obtain audio data.

The video signal processing circuit 108 and the graphic generation circuit 109 carry out scaling processing (resolution conversion processing), graphics data superimposition processing, and the like on the image data obtained by the MPEG decoder 107 or the image data received by the HDMI reception unit 102 as necessary.

The panel drive circuit 110 drives the display panel 111 based on the video (image) data output from the graphic generation circuit 109. The display control unit 124 controls the graphic generation circuit 109 and the panel drive circuit 110 to control display of the display panel 111. The display panel 111 is constituted of, for example, an LCD (Liquid Crystal Display), a PDP (Plasma Display Panel), or an organic EL panel (Organic Electro-Luminescence Panel).

It should be noted that although the example where the display control unit 124 is provided in addition to the CPU 121 is shown in this embodiment, display on the display panel 111 may be directly controlled by the CPU 121. Moreover, the CPU 121 and the display control unit 124 may be configured as one chip or as a plurality of cores. The power supply unit 127 supplies power to the respective units of the television receiver 100. The power supply unit 127 may be an AC power supply or a battery (storage battery, dry-cell battery).

The audio signal processing circuit 112 carries out requisite processing such as D/A conversion on the audio data obtained by the MPEG decoder 107. The audio amplification circuit 113 amplifies audio signals output from the audio signal processing circuit 112 and supplies the signals to the speaker 114. It should be noted that the speaker 114 may either be monaural or stereo. In addition, the number of speaker 114 may be one or two or more. Further, the speaker 114 may either be earphones or a headphone. Moreover, the speaker 114 may be a speaker that supports 2.1 channel, 5.1 channel, and the like. Furthermore, the speaker 114 may be connected wirelessly to the television receiver 100. Further, the speaker 114 may be other apparatuses.

The network terminal 116 is a terminal for connecting to a network and is connected to the Ethernet interface 115. The CPU 121, the flash ROM 122, the SDRAM 123, the Ethernet interface 115, and the display control unit 124 are connected to the internal bus 120.

The HDMI reception unit (HDMI sink) 102 receives a baseband image (video) and audio data supplied to the HDMI terminal 101 via the HDMI cable by communication conforming to HDMI. The high-speed bus interface 103 is an interface for a bidirectional communication channel that is configured using a reserve line and an HPD line configuring the HDMI cable.

The SPDIF transmission circuit 104 is a circuit for transmitting digital audio transmission signals (hereinafter, referred to as "SPDIF signals" as appropriate) of the IEC 60958 standard. The SPDIF transmission circuit 104 is a transmission circuit conforming to the IEC 60958 standard. In this embodiment, the SPDIF transmission circuit 104 generates SPDIF signals including audio data of respective channels using 2-channel or multichannel audio data SA. The audio data SA is 2-channel audio data, 5.1-channel audio data, 7.1-channel audio data, 10.2-channel audio data, 22.2-channel audio data, and the like obtained by the MPEG decoder 107, for example. The SPDIF signals will be described later in detail.

The high-speed bus interface 103 is inserted between the Ethernet interface 115 and the HDMI terminal 101. The high-speed bus interface 103 supplies reception data received from a counterpart apparatus via the HDMI cable and the HDMI terminal 101 to the CPU 121 via the Ethernet interface 115.

The high-speed bus interface 103 also transmits transmission data supplied from the CPU 121 via the Ethernet interface 115 to the counterpart apparatus from the HDMI terminal 101 via the HDMI cable. The high-speed bus interface 103 also transmits the SPDIF signals generated by the SPDIF transmission circuit 104 to the counterpart apparatus from the HDMI terminal 101 via the HDMI cable.

It should be noted that when transmitting received content data to a network, for example, the content data is output to the network terminal 116 via the Ethernet interface 115. Similarly, when transmitting received content data to a bidirectional communication channel of the HDMI cable, the content data is output to the HDMI terminal 101 via the Ethernet interface 115 and the high-speed bus interface 103. Here, a copyright protection technology such as HDCP, DTCP, and DTCP+ may be used for the encryption before outputting image data.

An operation of the television receiver 100 shown in FIG. 2 will simply be described. Television broadcast signals input to the antenna terminal 105 are supplied to the digital tuner 106. In the digital tuner 106, the television broadcast signals are processed, a predetermined transport stream corresponding to a user-selected channel is output, partial TSs (TS packets of video data, TS packets of audio data) are extracted, and the partial TSs are supplied to the MPEG decoder 107.

In the MPEG decoder 107, decode processing is carried out on a video PES packet constituted of TS packets of video data to obtain video data. The video data is subjected to scaling processing (resolution conversion processing), graphics data superimposition processing, and the like as necessary in the video signal processing circuit 108 and the graphic generation circuit 109 and then supplied to the panel drive circuit 110. Therefore, an image corresponding to the user-selected channel is displayed on the display panel 111.

Also in the MPEG decoder 107, decode processing is carried out on an audio PES packet constituted of TS packets of audio data to obtain audio data. The audio data is subjected to requisite processing such as D/A conversion by the audio signal processing circuit 112, amplified by the audio amplification circuit 113, and then supplied to the speaker 114. Therefore, audio corresponding to the user-selected channel is output from the speaker 114.

Further, content data (image data, audio data) supplied to the Ethernet interface 115 from the network terminal 116 or supplied from the HDMI terminal 101 to the Ethernet interface 115 via the high-speed bus interface 103 is supplied to the MPEG decoder 107. Operations after that are operations similar to those described above that are carried out when receiving television broadcast signals, and thus an image is displayed on the display panel 111 and audio is output from the speaker 114.

Further, the HDMI reception unit 102 acquires image data and audio data transmitted to the HDMI terminal 101 via the HDMI cable. The image data is supplied to the video signal processing circuit 108, and the audio data is supplied to the audio signal processing circuit 112. Operations after that are operations similar to those described above that are carried out when receiving television broadcast signals, and thus an image is displayed on the display panel 111 and audio is output from the speaker 114.

Further, SPDIF signals that are generated by the SPDIF transmission circuit 104 and include audio data of the respective channels of 2 channels or multi-channels are supplied to the high-speed bus interface 103. Then, by the high-speed bus interface 103, the SPDIF signals are transmitted from the HDMI terminal 101 to the audio amplifier 200 via the HDMI cable 610.

[Configuration Example of Audio Amplifier]

Figure 3:
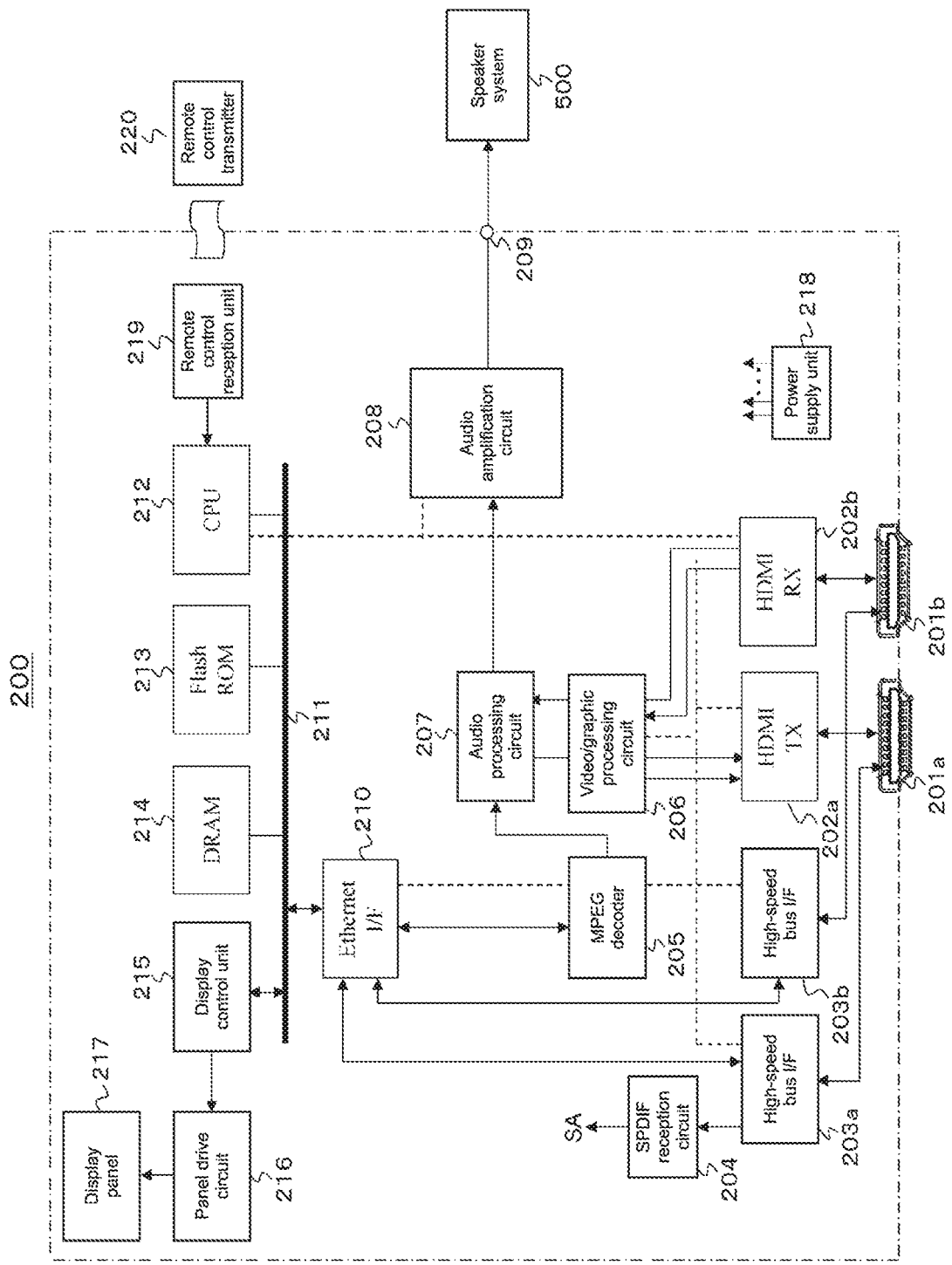
FIG. 3 A block diagram showing a configuration example of an audio amplifier configuring the AV system.

FIG. 3 shows a configuration example of the audio amplifier 200. The audio amplifier 200 includes the HDMI terminals 201a and 201b, the HDMI transmission unit 202a, the HDMI reception unit 202b, the high-speed bus interfaces 203a and 203b, and the SPDIF reception circuit 204.

The audio amplifier 200 also includes an MPEG decoder 205, a video/graphic processing circuit 206, an audio processing circuit 207, an audio amplification circuit 208, and an audio output terminal 209. The audio amplifier 200 also includes the Ethernet interface 210, an internal bus 211, a CPU 212, a flash ROM 213, a DRAM 214, a display control unit 215, a panel drive circuit 216, a display panel 217, a power supply unit 218, a remote control reception unit 219, and a remote control transmitter 220.

The CPU 212 controls operations of the respective units of the audio amplifier 200. The flash ROM 213 stores control software and data. The DRAM 214 configures a working area of the CPU 212. The CPU 212 develops software and data read out from the flash ROM 213 in the DRAM 214 and activates the software to control the respective units of the audio amplifier 200. The CPU 212, the flash ROM 213, the DRAM 214, the Ethernet interface 210, and the display control unit 215 are connected to the internal bus 211.

The remote control reception unit 219 receives a remote control signal (remote control code) transmitted from the remote control transmitter 220 and supplies it to the CPU 212. The CPU 212 controls the respective units of the audio amplifier 200 based on the remote control code. It should be noted that although a remote control unit is illustrated as the user instruction input unit in this embodiment, the user instruction input unit may take other configurations, the examples of which include a touch panel unit to which an instruction is input by a proximity/touch operation, a mouse, a keyboard, a gesture input unit that detects an instruction input by a camera, and an audio input unit to which an instruction is input by audio.

The HDMI transmission unit (HDMI source) 202a transmits a baseband video (image) and audio data to the HDMI cable from the HDMI terminal 201a by communication conforming to HDMI. The HDMI reception unit (HDMI sink) 202b receives the baseband video (image) and audio data supplied to the HDMI terminal 201b via the HDMI cable by communication conforming to HDMI. The HDMI transmission unit 202a and the HDMI reception unit 202b will be described later in detail.

The high-speed bus interfaces 203a and 203b are each an interface for bidirectional communication that uses a reserve line and an HPD line configuring the HDMI cable. The high-speed bus interfaces 203a and 203b will be described later in detail. The SPDIF reception circuit 204 is a circuit for receiving SPDIF signals (digital audio transmission signals of IEC 60958 standard). The SPDIF reception circuit 204 is a reception circuit conforming to the IEC 60958 standard. In this embodiment, the SPDIF reception circuit 204 receives SPDIF signals including audio data of the respective channels of 2 channels or multi-channels and outputs audio data of the respective channels.

The MPEG decoder 205 decodes partial TSs supplied to the Ethernet interface 210 via the high-speed bus interface 203a. In this case, the decode processing is carried out on an audio PES packet out of the partial TSs to obtain audio data.

The audio processing circuit 207 carries out requisite processing such as D/A conversion on the 2-channel or multichannel audio data that has been obtained by the MPEG decoder 205 or received by the SPDIF reception circuit 204. The audio amplification circuit 208 amplifies the 2-channel or multichannel audio signals obtained by the audio processing circuit 207 and outputs the signals to the audio output terminal 209. It should be noted that the 2-channel or multichannel speaker system 500 is connected to the audio output terminal 209.

The audio processing circuit 207 further carries out requisite processing on the audio data obtained by the HDMI reception unit 202b and then supplies the data to the HDMI transmission unit 202a. The video/graphic processing circuit 206 carries out graphics data superimposition processing and the like on the video (image) data obtained by the HDMI reception unit 202b and then supplies the data to the HDMI transmission unit 202a.

The display control unit 215 controls the panel drive circuit 216 for performing user interface display, status display of the audio amplifier 200, and the like and controls display of the display panel 217. The display panel 217 is constituted of, for example, an LCD (Liquid Crystal Display) or an organic EL panel (Organic Electro-Luminescence Panel).

It should be noted that although the example where the display control unit 215 is provided in addition to the CPU 212 is shown in this embodiment, display on the display panel 217 may be directly controlled by the CPU 212. Moreover, the CPU 212 and the display control unit 215 may be configured as one chip or as a plurality of cores. The power supply unit 218 supplies power to the respective units of the audio amplifier 200. The power supply unit 218 may be an AC power supply or a battery (storage battery, dry-cell battery).

An operation of the audio amplifier 200 shown in FIG. 3 will simply be described. The HDMI reception unit 202b receives the video (image) data and audio data transmitted from the BD player 300 to the HDMI terminal 201b via the HDMI cable 620. This video data and audio data are supplied to the HDMI transmission unit 202a via the video/graphic processing circuit 206 and the audio processing circuit 207 and transmitted to the television receiver 100 via the HDMI cable 610 connected to the HDMI transmission unit 202a.

The high-speed bus interface 203a receives partial TSs transmitted from the television receiver 100 via a predetermined line of the HDMI cable 610 connected to the HDMI terminal 201a. The partial TSs are supplied to the MPEG decoder 205 via the Ethernet interface 211. In the MPEG decoder 205, decode processing is carried out on a PES packet of audio data constituting the partial TS to obtain 2-channel or multichannel audio data.

This audio data is supplied to the audio processing circuit 207 to be subjected to requisite processing such as D/A conversion. Then, when muting is off, the audio signals of the respective channels output from the audio processing circuit 207 are amplified and output to the audio output terminal 209. Therefore, 2-channel or multichannel audio is output from the speaker system 500.

The high-speed bus interface 203a also receives SPDIF signals including the 2-channel or multichannel audio data, that are transmitted from the television receiver 100 via a predetermined line of the HDMI cable 610 connected to the HDMI terminal 201a. The SPDIF signals are supplied to the SPDIF reception circuit 204. The SPDIF reception circuit 204 processes the SPDIF signals so as to obtain the 2-channel or multichannel audio data.

This audio data is supplied to the audio processing circuit 207 to be subjected to requisite processing such as D/A conversion. Then, when muting is off, the audio signals of the respective channels output from the audio processing circuit 207 are amplified and output to the audio output terminal 209. Therefore, 2-channel or multichannel audio is output from the speaker system 500.

It should be noted that the partial TSs received by the high-speed bus interface 203a and supplied to the Ethernet interface 210 as described above are supplied to the high-speed bus interface 203b as transmission data. Therefore, the partial TSs are transmitted to the BD player 300 via the HDMI cable 620 connected to the HDMI terminal 201b.

[Configuration Example of BD Player]

Figure 4:
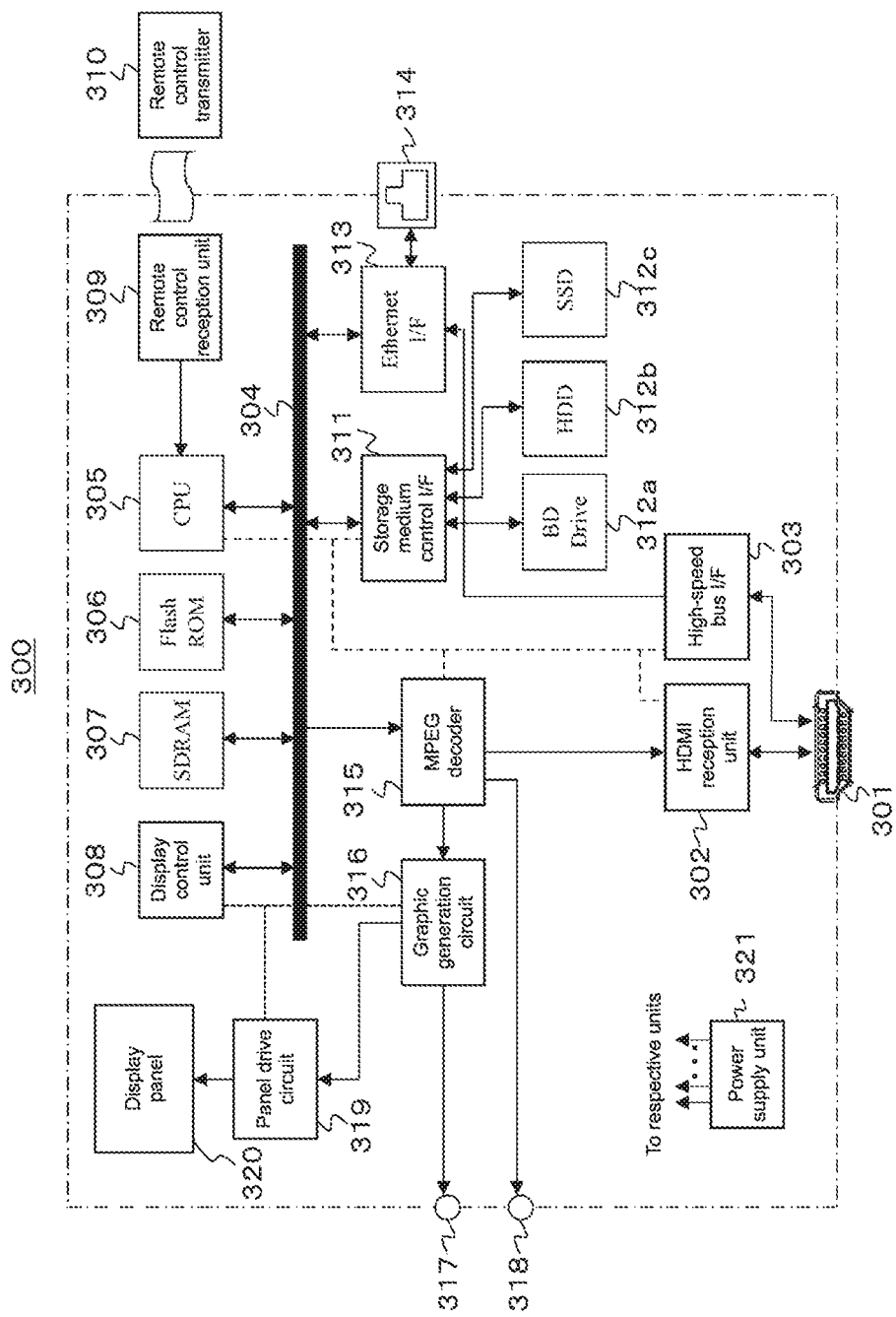
FIG. 4 A block diagram showing a configuration example of a BD player configuring the AV system.

FIG. 4 shows a configuration example of the BD player 300. The BD player 300 includes the HDMI terminal 301, the HDMI transmission unit 302, and the high-speed bus interface 303. The BD player 300 also includes an internal bus 304, a CPU (Central Processing Unit) 305, a flash ROM (Read Only Memory) 306, an SDRAM (Synchronous Random Access Memory) 307, a display control unit 308, a remote control reception unit 309, and a remote control transmitter 310.

The BD player 300 also includes a storage (recording) medium control interface 311, a BD (Blu-ray Disc) drive 312a, an HDD (Hard disk drive) 312b, an SSD (Solid State Drive) 312c, an Ethernet interface (Ethernet I/F) 313, and a network terminal 314. The BD player 300 also includes an MPEG (Moving Picture Expert Group) decoder 315, a graphic generation circuit 316, a video output terminal 317, and an audio output terminal 318.

The BD player 300 also includes a panel drive circuit 319, a display panel 320, and a power supply unit 321. The CPU 305, the flash ROM 306, the SDRAM 307, the storage medium control interface 311, the Ethernet interface 313, and the MPEG decoder 315 are connected to the internal bus 304.

The CPU 305 controls operations of the respective units of the BD player 300. The flash ROM 306 stores control software and data. The SDRAM 307 configures a working area of the CPU 305. The CPU 305 develops software and data read out from the flash ROM 306 in the SDRAM 307 and activates the software to control the respective units of the BD player 300.

The remote control reception unit 309 receives a remote control signal (remote control code) transmitted from the remote control transmitter 310 and supplies it to the CPU 305. The CPU 305 controls the respective units of the BD player 300 based on the remote control code. It should be noted that although a remote control unit is illustrated as the user instruction input unit in this embodiment, the user instruction input unit may take other configurations, the examples of which include a switch, a wheel, a touch panel unit to which an instruction is input by a proximity/touch operation, a mouse, a keyboard, a gesture input unit that detects an instruction input by a camera, and an audio input unit to which an instruction is input by audio.

The BD drive 312a records and reproduces content data to/from a BD disc as a disc-type recording medium. The HDD 312b records and reproduces content data. The SSD 312c records and reproduces content data to/from a semiconductor memory such as a memory card.

The BD drive 312a, the HDD 312b, and the SSD 312c are connected to the internal bus 304 via the storage medium control interface 311. For example, a SATA interface is used as interfaces for the BD drive 312a and the HDD 312b. Further, for example, a SATA interface or a PCIe interface is used as an interface for the SSD 312c.

The MPEG decoder 315 carries out decode processing on an MPEG2 stream reproduced by the BD drive 312a, the HDD 312b, or the SSD 312c to obtain image and audio data. The graphic generation circuit 316 carries out graphics data superimposition processing and the like on the image data obtained by the MPEG decoder 315 as necessary. The video output terminal 317 outputs the image data output from the graphic generation circuit 316. The audio output terminal 318 outputs the audio data obtained by the MPEG decoder 315.

The panel drive circuit 319 drives the display panel 320 based on the video (image) data output from the graphic generation circuit 316. The display control unit 308 controls the graphic generation circuit 316 and the panel drive circuit 319 to control display on the display panel 320. The display panel 320 is constituted of, for example, an LCD (Liquid Crystal Display), a PDP (Plasma Display Panel), or an organic EL panel (Organic Electro-Luminescence Panel).

It should be noted that although the example where the display control unit 308 is provided in addition to the CPU 305 is shown in this embodiment, display on the display panel 320 may be directly controlled by the CPU 305. Moreover, the CPU 305 and the display control unit 308 may be configured as one chip or as a plurality of cores. The power supply unit 321 supplies power to the respective units of the BD player 300. The power supply unit 321 may be an AC power supply or a battery (storage battery, dry-cell battery).

The HDMI transmission unit (HDMI source) 302 transmits a baseband image (video) and audio data from the HDMI terminal 301 by communication conforming to HDMI. The high-speed bus interface 303 is an interface for a bidirectional communication channel that is configured using a reserve line and an HPD line configuring the HDMI cable.

The high-speed bus interface 303 is inserted between the Ethernet interface 313 and the HDMI terminal 301. The high-speed bus interface 303 transmits transmission data supplied from the CPU 305 to the counterpart apparatus from the HDMI terminal 301 via the HDMI cable. The high-speed bus interface 303 also supplies reception data received from the counterpart apparatus via the HDMI cable and the HDMI terminal 301 to the CPU 305.

An operation of the BD player 300 shown in FIG. 4 will simply be described. At the time of recording, content data to be recorded is acquired via a digital tuner (not shown), from the network terminal 314 via the Ethernet interface 311, or from the HDMI terminal 301 via the high-speed bus interface 303. The content data is input to the storage medium control interface 311 and recorded onto a BD disc by the BD drive 312a, the HDD 312b, or a semiconductor memory by the SSD 312c.

At the time of reproduction, content data (MPEG stream) reproduced by the BD drive 312a, the HDD 312b, or the SSD 312c is supplied to the MPEG decoder 315 via the storage medium control interface 311. The MPEG decoder 315 carries out decode processing on the reproduced content data to obtain baseband image and audio data. The image data is output to the video output terminal 317 via the graphic generation circuit 316. Further, the audio data is output to the audio output terminal 318.

Further, the image data obtained by the MPEG decoder 315 is supplied to the panel drive circuit 319 via the graphic generation circuit 316 according to a user operation, and a reproduction image is displayed on the display panel 320. Moreover, the audio data obtained by the MPEG decoder 315 is supplied to a speaker (not shown) according to a user operation so that audio corresponding to the reproduction image is output.

Furthermore, when transmitting the image and audio data obtained by the MPEG decoder 315 using an HDMI TMDS channel during reproduction, the image and audio data is supplied to the HDMI transmission unit 302 to be packaged, and then output to the HDMI terminal 301 from the HDMI transmission unit 302.

Also when transmitting content data reproduced by the BD drive 312a, the HDD 312b, or the SSD 312c to a network during reproduction, the content data is output to the network terminal 314 via the Ethernet interface 313. Similarly, when transmitting content data reproduced by the BD drive 312a, the HDD 312b, or the SSD 312c to a bidirectional communication channel of the HDMI cable 620 during reproduction, the content data is output to the HDMI terminal 301 via the high-speed bus interface 303. Here, a copyright protection technology such as HDCP, DTCP, and DTCP+ may be used for the encryption before outputting image data.

[Configuration Example of HDMI Transmission Unit/Reception Unit]

Figure 5:
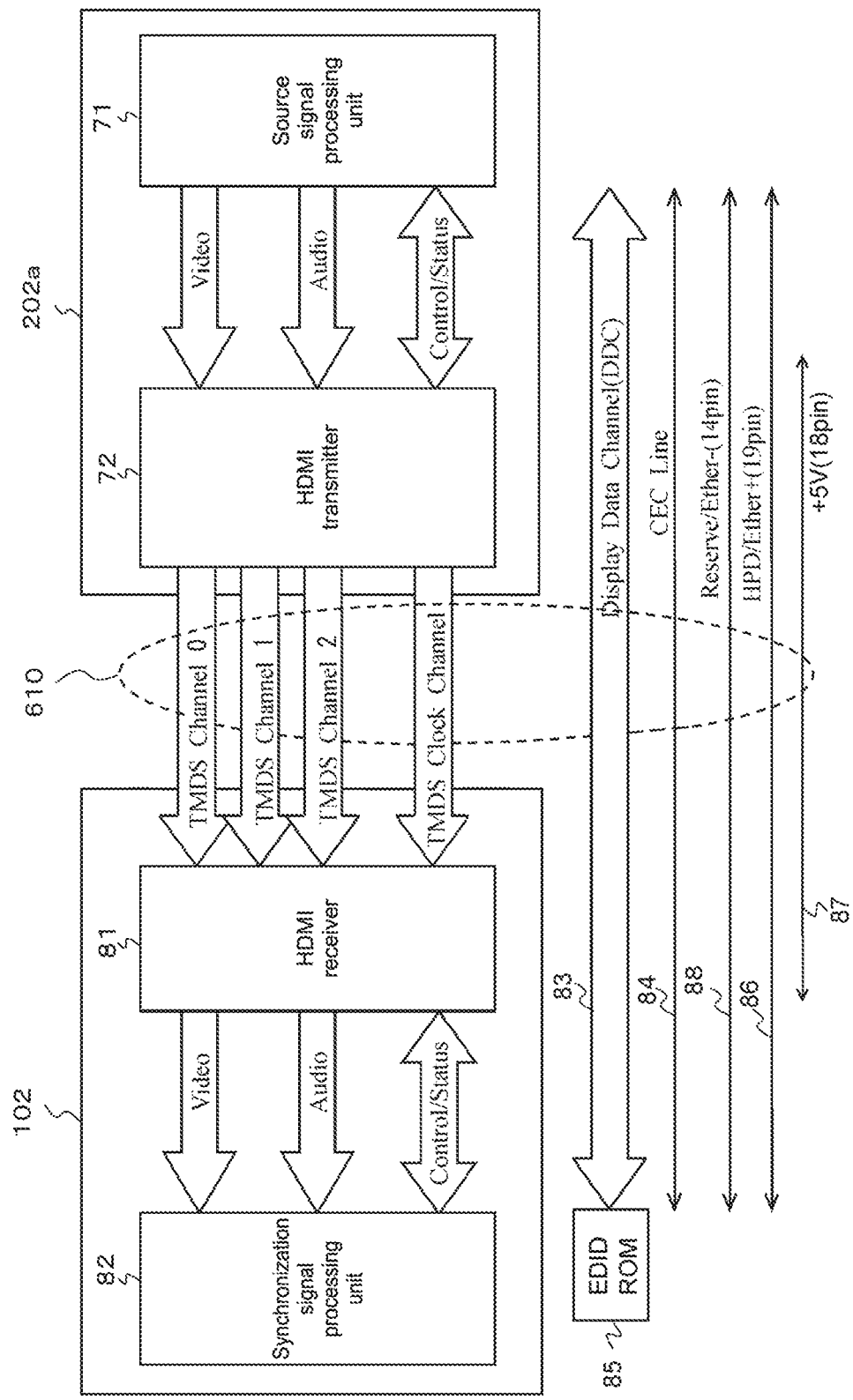
FIG. 5 A block diagram showing a configuration example of an HDMI reception unit of the television receiver and an HDMI transmission unit of the audio amplifier.

FIG. 5 shows a configuration example of the HDMI reception unit 102 of the television receiver 100 and the HDMI transmission unit 202a of the audio amplifier 200 in the AV system 10 shown in FIG. 1. It should be noted that since configuration examples of the HDMI reception unit 202b of the audio amplifier 200 and the HDMI transmission unit 302 of the BD player 300 are similar to those described above, descriptions thereof will be omitted.

The HDMI transmission unit 202a unidirectionally transmits baseband (uncompressed) differential signals of image data for one screen to the HDMI reception unit 102 by a plurality of channels in an effective image section (hereinafter, referred to as "active video section" as appropriate) as a section obtained by removing a horizontal blanking period and a vertical blanking period from a section between a certain vertical synchronization signal and the next vertical synchronization signal (hereinafter, referred to as "video field" as appropriate). The HDMI transmission unit 202a also unidirectionally transmits, in the horizontal blanking period and the vertical blanking period, differential signals corresponding to audio data and a control packet (Control Packet) accompanying image data, other auxiliary data, and the like to the HDMI reception unit 102 by the plurality of channels.

The HDMI transmission unit 202a includes a source signal processing unit 71 and an HDMI transmitter 72. Uncompressed baseband image (Video) and audio (Audio) data are supplied to the source signal processing unit 71. The source signal processing unit 71 carries out requisite processing on the supplied image and audio data and supplies the data to the HDMI transmitter 72. The source signal processing unit 71 also exchanges control information, information for notifying a status (Control/Status), and the like with the HDMI transmitter 72 as necessary.

The HDMI transmitter 72 converts the image data supplied from the source signal processing unit 71 into corresponding differential signals and unidirectionally transmits the signals to the HDMI reception unit 102 connected via the HDMI cable 610 using 3 TMDS channels #0, #1, and #2 as the plurality of channels.

The HDMI transmitter 72 also converts the audio data and control packet (Control Packet) accompanying the uncompressed image data and other auxiliary data (auxiliary data) that are supplied from the source signal processing unit 71 and control data (control data) of the vertical synchronization signal (VSYNC), the horizontal synchronization signal (HSYNC), and the like into corresponding differential signals, and unidirectionally transmits the signals to the HDMI reception unit 102 connected via the HDMI cable 610 using the 3 TMDS channels #0, #1, and #2.

The HDMI transmitter 72 also transmits pixel clocks synchronized with the image data to be transmitted by the 3 TMDS channels #0, #1, and #2 to the HDMI reception unit 102 connected via the HDMI cable 610 by a TMDS clock channel.

The HDMI reception unit 102 receives the differential signals corresponding to the image data that are unidirectionally transmitted from the HDMI transmission unit 202a by the plurality of channels in the active video section and receives the differential signals corresponding to the auxiliary data and control data that are transmitted from the HDMI transmission unit 202a by the plurality of channels in the horizontal blanking period and the vertical blanking period.

The HDMI reception unit 102 includes an HDMI receiver 81 and a synchronization signal processing unit 82. The HDMI receiver 81 synchronizes the differential signals corresponding to the image data and the differential signals corresponding to the auxiliary data and control data, that are unidirectionally transmitted from the HDMI transmission unit 202a connected via the HDMI cable 610 using the TMDS channels #0, #1, and #2, with the pixel clocks also transmitted from the HDMI transmission unit 202a using the TMDS clock channel and receives the signals. The HDMI receiver 81 also converts the differential signals into corresponding image data, auxiliary data, and control data and supplies the data to the synchronization signal processing unit 82 as necessary.

The synchronization signal processing unit 82 carries out requisite processing on the data supplied from the HDMI receiver 81 and outputs it. In addition, the synchronization signal processing unit 82 exchanges control information, information for notifying a status (Control/Status), and the like with the HDMI receiver 81 as necessary.

As the HDMI transmission channel, there are transmission channels called DDC (Display Data Channel) 83 and CEC line 84 in addition to the 3 TMDS channels #0, #1, and #2 for synchronizing image data, auxiliary data, and control data with pixel clocks and performing unidirectional serial transmission from the HDMI transmission unit 202a to the HDMI reception unit 102 and the TMDS clock channel as a transmission channel for transmitting pixel clocks.

The DDC 83 is constituted of two lines (signal lines) (not shown) that are included in the HDMI cable 610 and is used for the source apparatus to read out E-EDID (Enhanced-Extended Display Identification) from the sink apparatus connected via the HDMI cable 610. In other words, the sink apparatus includes an EDIDROM 85. The source apparatus reads out, from the sink apparatus connected via the HDMI cable 610, E-EDID stored in the EDIDROM 85 via the DDC 83 and recognizes settings and performance of the sink apparatus based on that E-EDID.

The CEC line 84 is constituted of one line (not shown) included in the HDMI cable 610 and is used for performing bidirectional communication of control data between the source apparatus and the sink apparatus.

The HDMI cable 610 also includes a line 86 connected to a pin called HPD (Hot Plug Detect). The source apparatus is capable of detecting a connection with the sink apparatus using the line 86. The HDMI cable 610 also includes a line 87 used for supplying power from the source apparatus to the sink apparatus. The HDMI cable 610 also includes a reserve line 88.

Figure 6:
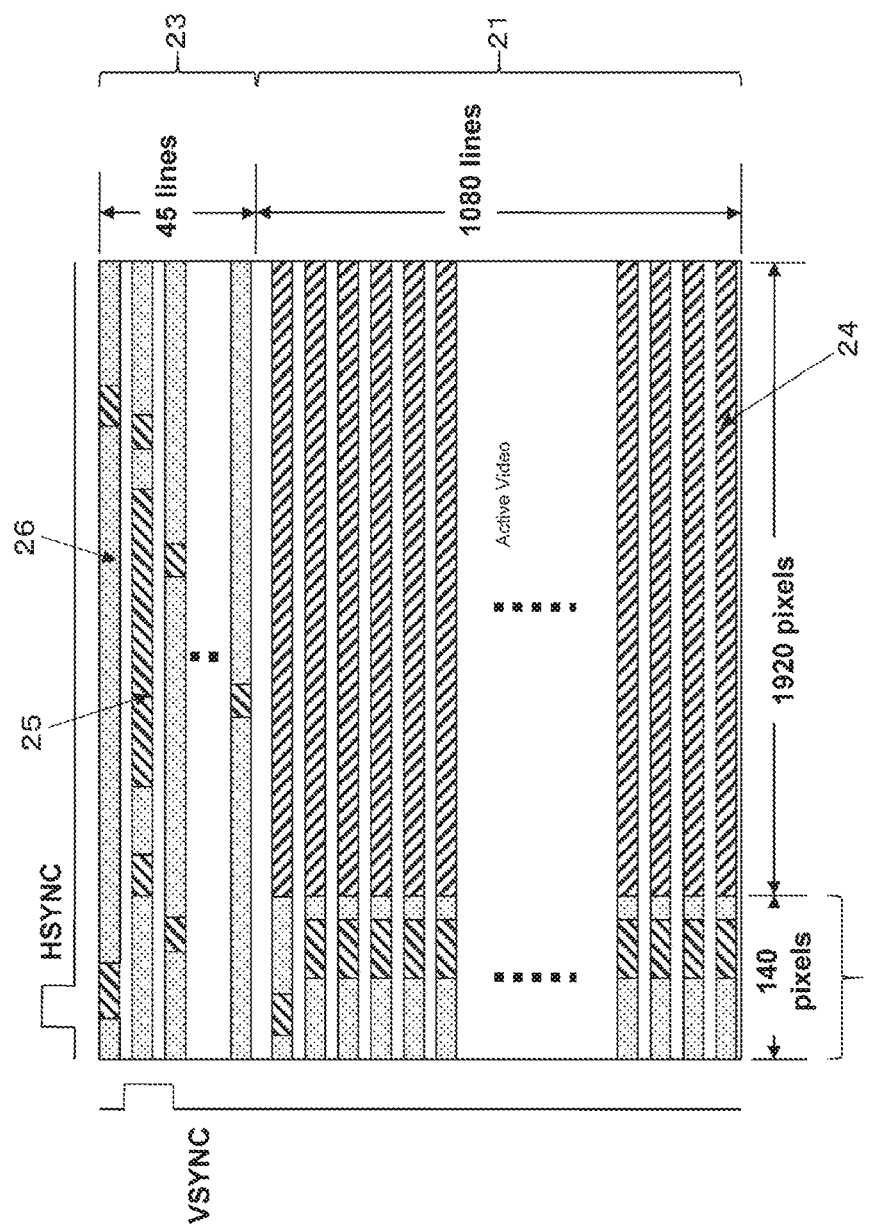
FIG. 6 A diagram showing various transmission data sections in a case where image data having a horizontal*vertical size of 1920 pixels*1080 lines is transmitted in a TMDS channel.

FIG. 6 shows various transmission data sections in a case where image data having a horizontal*vertical size of 1920 pixels*1080 lines is transmitted in the TMDS channel. In a video field (Video Field) in which transmission data is transmitted by 3 TMDS channels of HDMI, there exist 3 types of sections which are a video data section 24 (Video Data Period), a data island section 25 (Data Island Period), and a control section 26 (Control Period) according to the type of transmission data.

Here, the video field section is a section between a rising edge of a certain vertical synchronization signal (Active Edge) and a rising edge of the next vertical synchronization signal and is sectioned into a horizontal flyback period 22 (Horizontal Blanking), a vertical flyback period 23 (Vertical Blanking), and an effective pixel section 21 (Active Video) as a section obtained by removing the horizontal flyback period and the vertical flyback period from the video field section.

The video data section 24 is allocated to the effective pixel section 21. In the video data section 24, data having effective pixels (Active Pixel) of 1920 pixels*1080 lines, that configure uncompressed image data for one screen, is transmitted. The data island section 25 and the control section 26 are allocated to the horizontal flyback period 22 and the vertical flyback period 23. In the data island section 25 and the control section 26, auxiliary data (Auxiliary Data) is transmitted.

Specifically, the data island section 25 is allocated to parts of the horizontal flyback period 22 and the vertical flyback period 23. In the data island section 25, a packet of audio data and the like as data unrelated to control, for example, is transmitted out of auxiliary data. The control section 26 is allocated to other parts of the horizontal flyback period 22 and the vertical flyback period 23. In the control section 26, a vertical synchronization signal, a horizontal synchronization signal, a control packet, and the like as data related to control, for example, are transmitted out of auxiliary data.

FIG. 7 shows an HDMI connector pin arrangement. This pin arrangement is an example of Type A (type-A). Two lines that are differential lines through which TMDS Data#i+ and TMDS Data#i− as differential signals of TMDS channel #i are transmitted are connected to pins to which TMDS Data#i+ is allocated (pins of pin numbers 1, 4, and 7) and pins to which TMDS Data#i− is allocated (pins of pin numbers 3, 6, and 9).

Further, the CEC line 84 through which CEC signals as control data are transmitted is connected to a pin having a pin number 13, and a pin having a pin number 14 is a reserved (Reserved) pin. Moreover, the line through which SDA (Serial Data) signals of E-EDID and the like are transmitted is connected to a pin having a pin number 16, and the line through which SCL (Serial Clock) signals as clock signals used for synchronization when transmitting and receiving SDA signals is connected to a pin having a pin number 15. The DDC 83 described above is configured by the line through which SDA signals are transmitted and the line through which SCL signals are transmitted.

Further, the HPD line 86 used for the source apparatus to detect a connection with the sink apparatus as described above is connected to a pin having a pin number 19. Furthermore, the power supply line 87 for supplying power as described above is connected to a pin having a pin number 18.

[Configuration Example of High-Speed Bus Interface]

Figure 8:
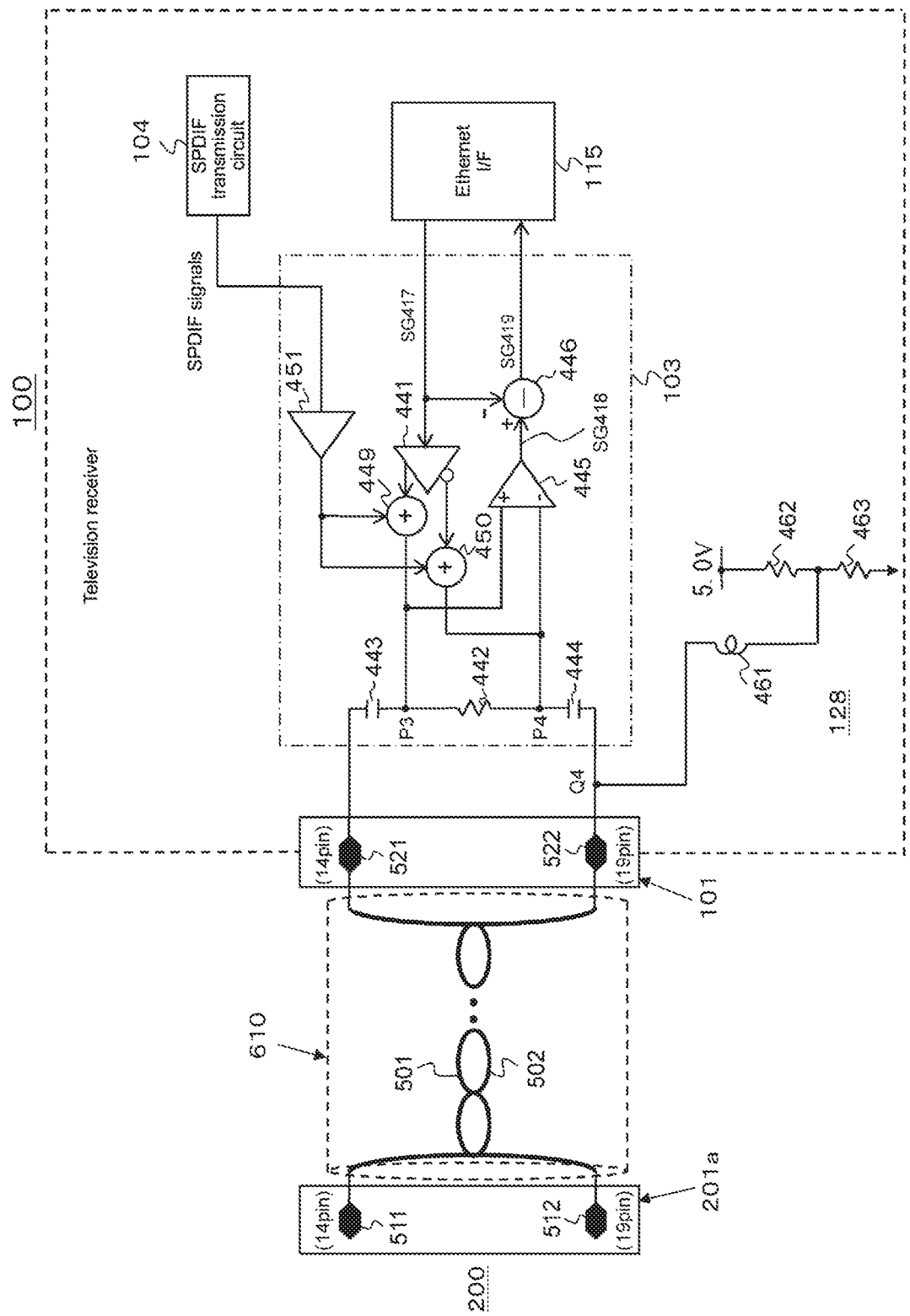
FIG. 8 A diagram showing a configuration example of a high-speed bus interface of the television receiver.

FIG. 8 shows a configuration example of the high-speed bus interface 103 of the television receiver 100 in the AV system 10. Of the plurality of lines configuring the HDMI cable 610, the Ethernet interface 115 performs LAN (Local Area Network) communication, that is, exchanges Ethernet signals, using a transmission channel constituted of a pair of lines including the reserve line and the HPD line. The SPDIF transmission circuit 104 transmits SPDIF signals using the transmission channel constituted of the pair of lines described above.

The television receiver 100 includes a LAN signal transmission circuit 441, a termination resistor 442, AC coupling capacitors 443 and 444, a LAN signal reception circuit 445, a subtraction circuit 446, addition circuits 449 and 450, and an amplifier 451, which configure the high-speed bus interface 103. The television receiver 100 includes a choke coil 461 and resistors 462 and 463, which configure a plug connection transmission circuit 128.

A series circuit of the AC coupling capacitor 443, the termination resistor 442, and the AC coupling capacitor 444 is connected between a 14 pin terminal 521 and 19 pin terminal 522 of the HDMI terminal 101. Further, a series circuit of the resistors 462 and 463 is connected between the power supply wire (+5.0 V) and a grounding wire. In addition, a connection point between the resistors 462 and 463 is connected to a connection point Q4 between the 19 pin terminal 522 and the AC coupling capacitor 444 via the choke coil 461.

A connection point P3 between the AC coupling capacitor 443 and the termination resistor 442 is connected to an output side of the addition circuit 449 and also to a positive input side of the LAN signal reception circuit 445. In addition, a connection point P4 between the AC coupling capacitor 444 and the termination resistor 442 is connected to an output side of the addition circuit 450 and also to a negative input side of the LAN signal reception circuit 445.

One of input sides of the addition circuit 449 is connected to a positive output side of the LAN signal transmission circuit 441, and SPDIF signals output from the SPDIF transmission circuit 104 are supplied to the other one of the input sides of the addition circuit 449 via the amplifier 451. Further, one of input sides of the addition circuit 450 is connected to a negative output side of the LAN signal transmission circuit 441, and SPDIF signals output from the SPDIF transmission circuit 104 are supplied to the other one of the input sides of the addition circuit 450 via the amplifier 451.

A transmission signal (transmission data) SG417 is supplied from the Ethernet interface 115 to the input side of the LAN signal transmission circuit 441. Further, an output signal SG418 of the LAN signal reception circuit 445 is supplied to a positive-side terminal of the subtraction circuit 446, and the transmission signal SG417 is supplied to a negative-side terminal of the subtraction circuit 446. In the subtraction circuit 446, the transmission signal SG417 is subtracted from the output signal SG418 of the LAN signal reception circuit 445, to obtain a reception signal (reception data) SG419. When a LAN signal (Ethernet signal) is transmitted as a differential signal via the reserve line and the HPD line, the reception signal SG419 becomes the LAN signal. The reception signal SG419 is supplied to the Ethernet interface 115.

Figure 9:
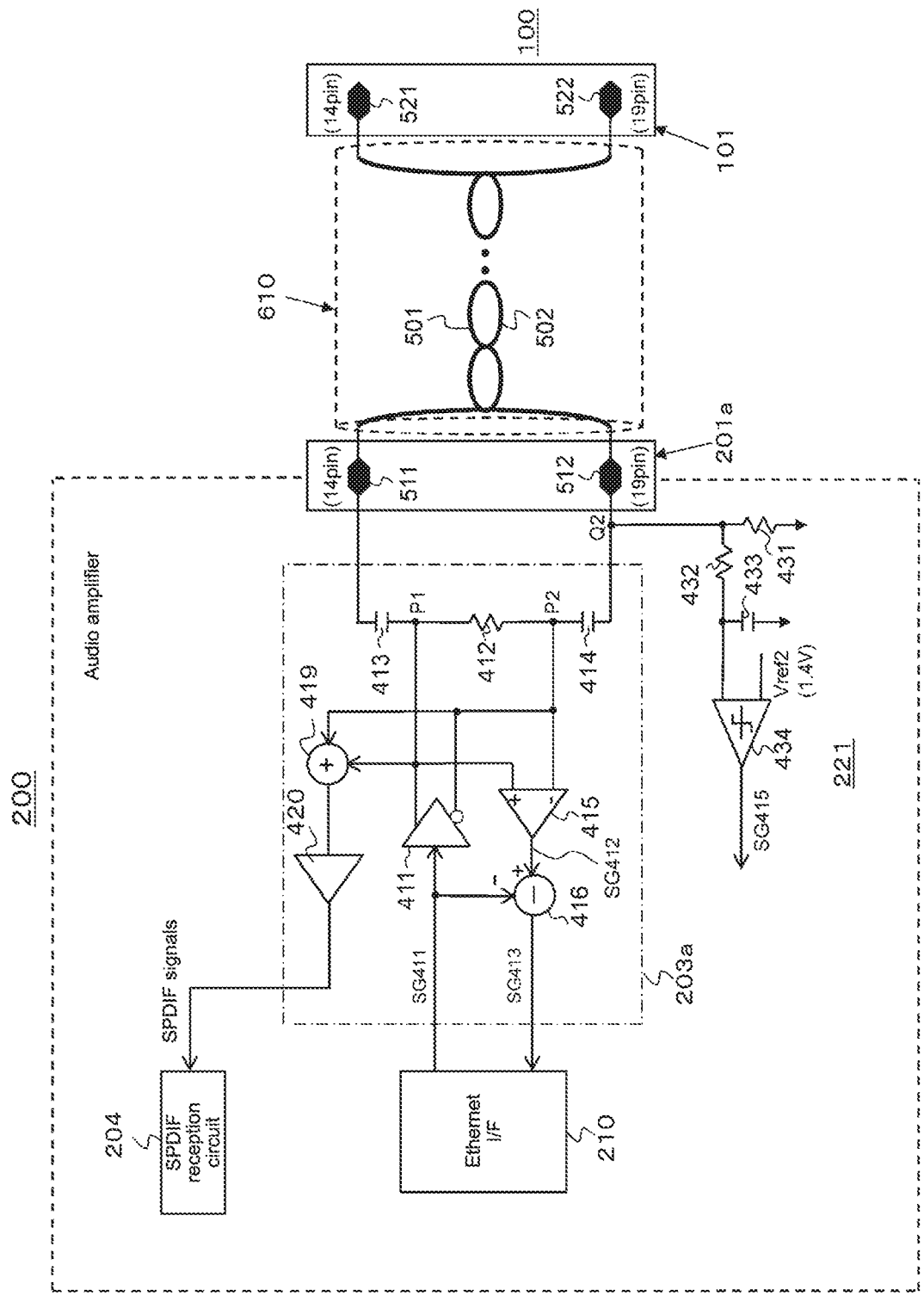
FIG. 9 A diagram showing a configuration example of a high-speed bus interface of the audio amplifier.

FIG. 9 shows a configuration example of the high-speed bus interface 203a of the audio amplifier 200 in the AV system 10 shown in FIG. 1. Of the plurality of lines configuring the HDMI cable 610, the Ethernet interface 210 performs LAN (Local Area Network) communication, that is, exchanges Ethernet signals, using a transmission channel constituted of a pair of lines including the reserve line and the HPD line. The SPDIF reception circuit 204 receives SPDIF signals using the transmission channel constituted of the pair of lines described above.

The audio amplifier 200 includes a LAN signal transmission circuit 411, a termination resistor 412, AC coupling capacitors 413 and 414, a LAN signal reception circuit 415, a subtraction circuit 416, an addition circuit 419, and an amplifier 420, which configure the high-speed bus interface 203a. The audio amplifier 200 also includes a pulldown resistor 431, a resistor 432, a capacitor 433, and a comparator 434, which configure a plug connection detection circuit 221. Here, the resistor 432 and the capacitor 433 configure a low-pass filter.

A series circuit of the AC coupling capacitor 413, the termination resistor 412, and the AC coupling capacitor 414 is connected between a 14 pin terminal 511 and 19 pin terminal 512 of the HDMI terminal 201a. Further, a connection point P1 between the AC coupling capacitor 413 and the termination resistor 412 is connected to a positive output side of the LAN signal transmission circuit 411 and also to a positive input side of the LAN signal reception circuit 415.

A connection point P2 between the AC coupling capacitor 414 and the termination resistor 412 is connected to a negative output side of the LAN signal transmission circuit 411 and also to a negative input side of the LAN signal reception circuit 415. A transmission signal (transmission data) SG411 is supplied from the Ethernet interface 210 to the input side of the LAN signal transmission circuit 411.

An output signal SG412 of the LAN signal reception circuit 415 is supplied to a positive-side terminal of the subtraction circuit 416, and a transmission signal (transmission data) SG411 is supplied to a negative-side terminal of the subtraction circuit 416. In the subtraction circuit 416, the transmission signal SG411 is subtracted from the output signal SG412 of the LAN signal reception circuit 415, to obtain a reception signal SG413. When a LAN signal (Ethernet signal) is transmitted as a differential signal via the reserve line and the HPD line, the reception signal SG413 becomes the LAN signal. The reception signal SG413 is supplied to the Ethernet interface 210.

A connection point Q2 between the AC coupling capacitor 414 and the 19 pin 512 is connected to a grounding wire via the pulldown resistor 431 and also connected to the grounding wire via a series circuit of the resistor 432 and the capacitor 433. In addition, an output signal of the low-pass filter that is obtained at the connection point between the resistor 432 and the capacitor 433 is supplied to one of input terminals of the comparator 434. In the comparator 434, the output signal of the low-pass filter is compared with a reference voltage Vref2 (+1.4 V) supplied to the other one of the input terminals. The output signal SG415 of the comparator 434 is supplied to a controller (CPU) (not shown) of the audio amplifier 200.

Further, a connection point P1 between the AC coupling capacitor 413 and the termination resistor 412 is connected to one of input terminals of the addition circuit 419. Further, a connection point P2 between the AC coupling capacitor 414 and the termination resistor 412 is connected to the other one of the input terminals of the addition circuit 419. The output signal of the addition circuit 419 is supplied to the SPDIF reception circuit 115 via the amplifier 420. When an SPDIF signal is transmitted as an in-phase signal via the reserve line and the HPD line, the output signal of the addition circuit 419 becomes the SPDIF signal.

It should be noted that although specific descriptions will be omitted, the high-speed bus interface 203*b* of the audio amplifier 200 has a configuration similar to that obtained by removing a portion related to SPDIF signals from the high-speed bus interface 103 shown in FIG. 8. Moreover, although specific descriptions will be omitted, the high-speed bus interface 303 of the BD player 300 has a configuration similar to that obtained by removing a portion related to SPDIF signals from the high-speed bus interface 203*a* shown in FIG. 9.

[Details of SPDIF Signals]

Figure 10:
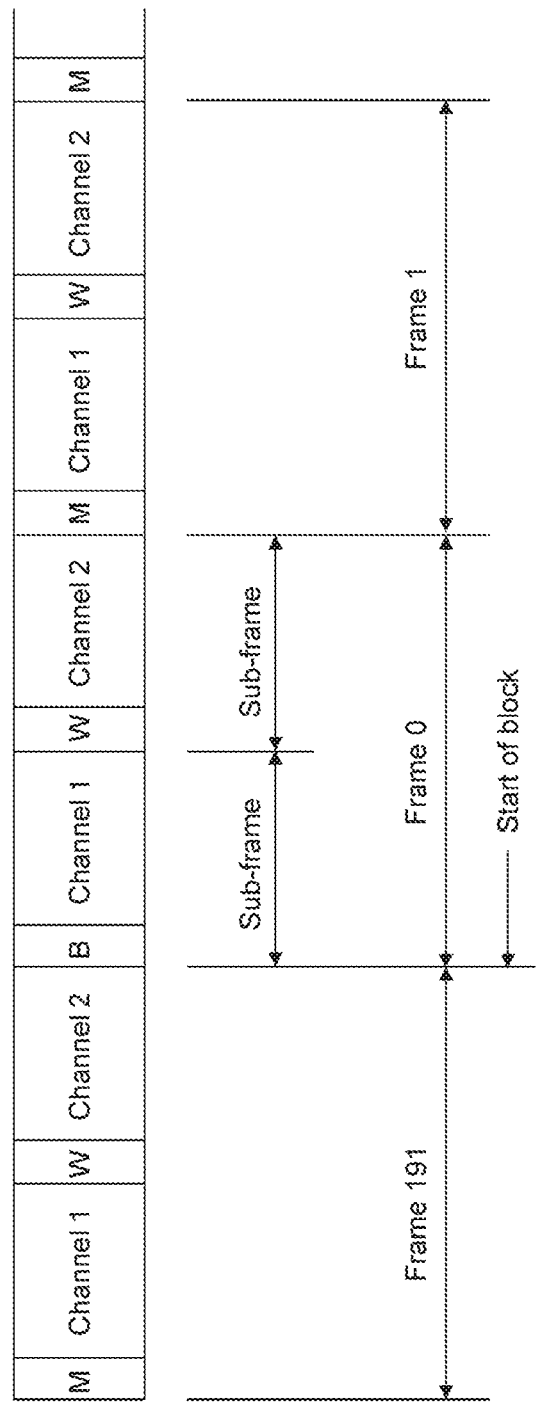
FIG. 10 A diagram showing a frame configuration in an IEC 60958 standard.

First, a general outline of the IEC 60958 standard will be described. FIG. 10 shows a frame configuration in the IEC 60958 standard. Each frame is constituted of two sub-frames. In the case of 2-channel stereo audio, a left channel signal is included in the first sub-frame, and a right channel signal is included in the second sub-frame.

As will be described later, a preamble is provided at a head of a sub-frame. "M" is assigned to the left channel signal as the preamble, and "W" is assigned to the right channel signal as the preamble. It should be noted that "B" that indicates a start of a block is assigned to the preamble at the head of every 192 frames. In other words, 1 block is constituted of 192 frames. The block is a unit configuring a channel status to be described later.

Figure 11:
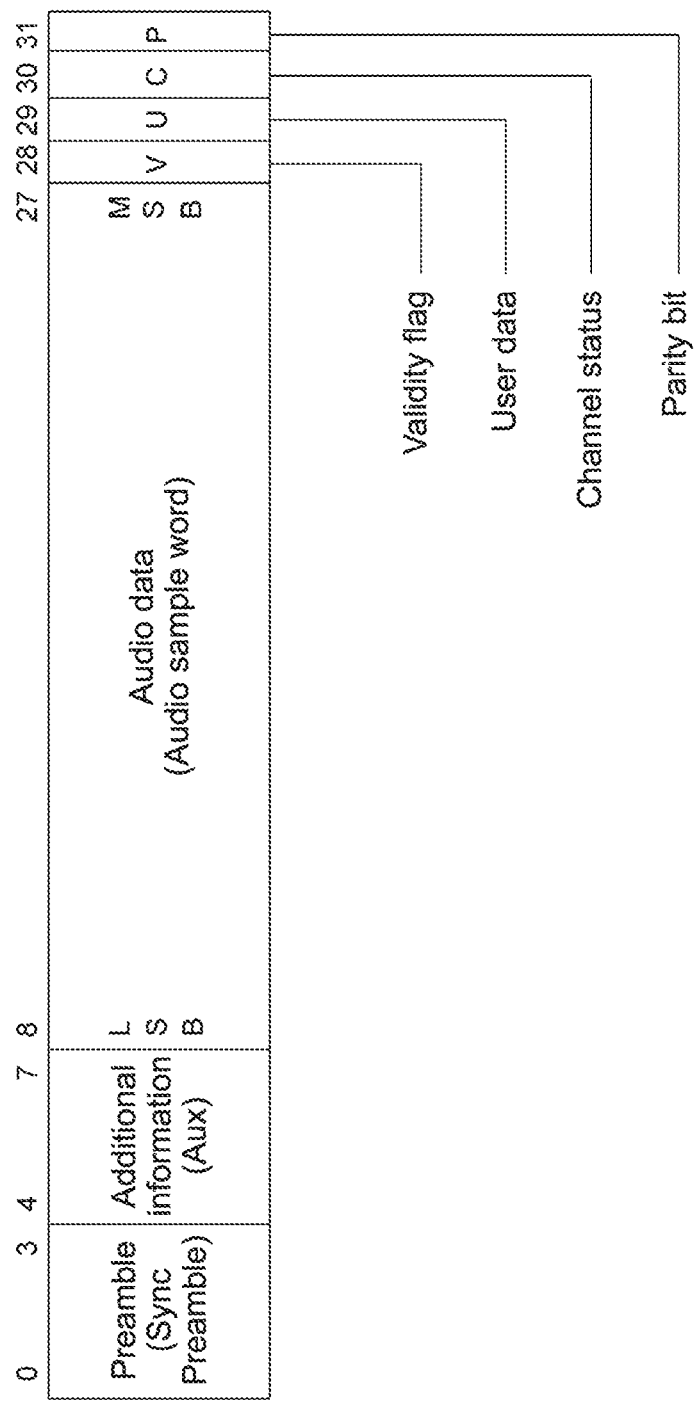
FIG. 11 A diagram showing a sub-frame configuration in the IEC 60958 standard.

FIG. 11 shows a sub-frame configuration in the IEC 60958 standard. The sub-frame is constituted of 0 to 31st time slots, that is, a total of 32 time slots. The 0 to 3rd time slots indicate a preamble (Sync Preamble). This preamble shows one of "M", "W", and "B" for distinguishing left and right channels from each other or expressing a block start position as described above.

The 4th to 27th time slots are a main data field and the entire time slots express audio data in a case where a 24-bit code range is adopted. Moreover, 8th to 27th time slots express audio data (Audio sample word) in a case where a 20-bit code range is adopted. In the latter case, the 4th to 7th time slots can be used as additional information (Auxiliary sample bits).

A 28th time slot is a validity flag (Validity Flag) of the main data field. A 29th time slot expresses 1 bit of user data (User data). A series of user data can be configured by accumulating this 29th slot across frames. A message of this user data is configured with an 8-bit information unit (IU: Information Unit) being a unit, and one message includes 3 to 129 information units.

0- to 8-bit "0" may exist among the information units. The head of the information unit is identified by a start bit "1". The first 7 information units within the message is reserved, and a user can set arbitrary information in 8th and subsequent information units. An interval between messages is divided by "0" of 8 bits or more.

A 30th time slot expresses 1 bit of a channel status (Channel status). A serial channel status can be configured by accumulating this 30th slot for each block across frames. It should be noted that the head position of a block is indicated by the preamble "B" (0 to 3rd time slots) as described above.

A 31st time slot is a parity bit (Parity bit). This parity bit is assigned so that the number of "0" and "1" included in the 4th to 31st time slots becomes an even number.

Figure 12:
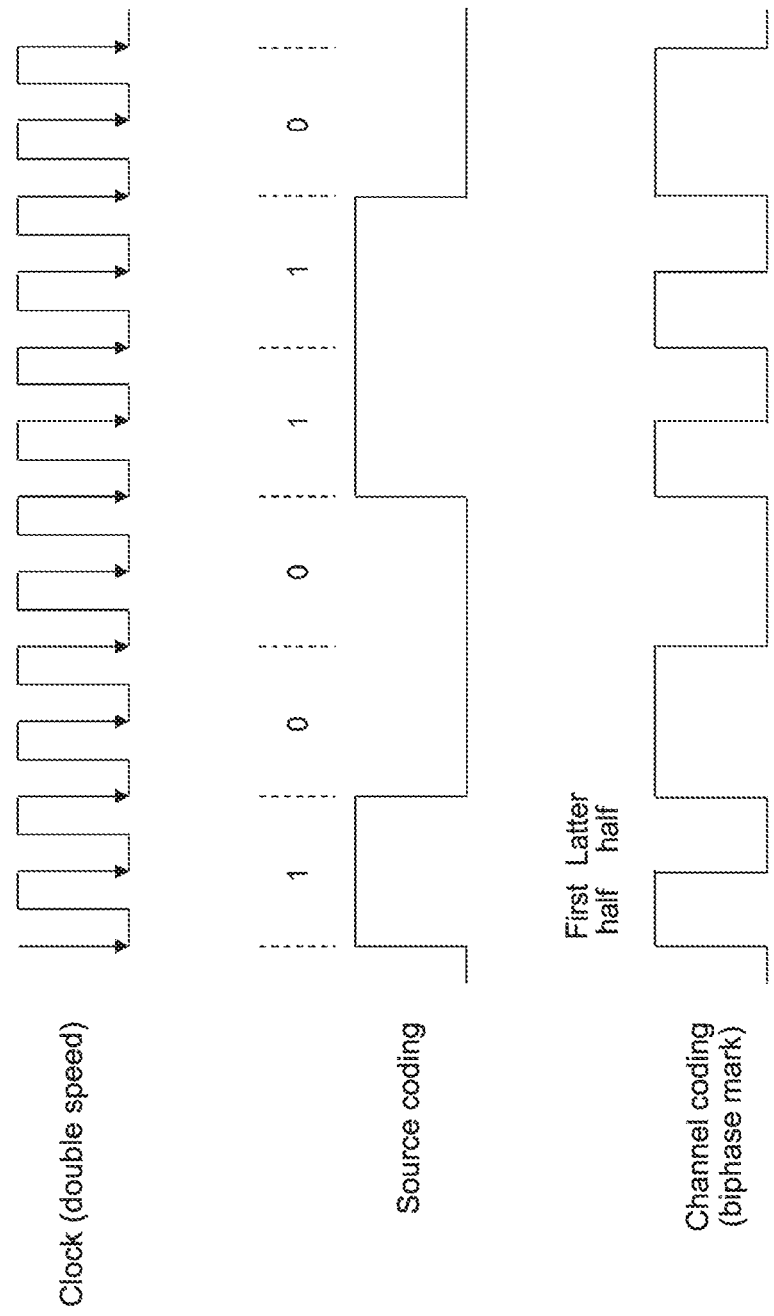
FIG. 12 A diagram showing a signal modulation system in the IEC 60958 standard.

FIG. 12 shows a signal modulation system in the IEC 60958 standard. The 4th to 31st time slots excluding the preamble out of the sub-frame are subjected to biphase mark modulation. Clocks that are twice as fast as the original signals (source coding) are used for the biphase mark modulation. When the clock cycle of the original signals is split into the first half and the latter half, the biphase mark modulation output is always inverted at edges of the first-half clock cycle. Moreover, at edges of the latter-half clock cycle, the output is inverted when the original signals indicate "1" and is not inverted when the original signals indicate "0". Accordingly, clock components in the original signals can be extracted from the signals subjected to the biphase mark modulation.

FIG. 13 shows channel coding of the preambles in the IEC 60958 standard. As described above, the 4th to 31st time slots of the sub-frame are subjected to the biphase mark modulation. On the other hand, the preamble of 0 to 3rd time slots is handled as a bit pattern in sync with the double-speed clocks without being subjected to the normal biphase mark modulation. Specifically, by allocating 2 bits to each of the 0 to 3rd time slots, an 8-bit pattern as shown in the figure can be obtained.

When the preceding state is "0", "11101000" is allocated to the preamble "B", "11100010" is allocated to the preamble "M", and "1100100" is allocated to the preamble "W". On the other hand, when the preceding state is "1", "00010111" is allocated to the preamble "B", "00011101" is allocated to the preamble "M", and "00011011" is allocated to the preamble "W".

FIG. 14 schematically shows a channel status format in the IEC 60958 standard. The channel status is obtained by accumulating the 30th time slot in the sub-frame for each block. In the figure, contents of the channel status are arranged 1 byte each in the longitudinal direction, and a bit configuration in each byte is shown in the lateral direction. It should be noted that here, descriptions will be given while assuming a consumer use (Consumer use) format.

In a 0 byte, a 0 bit (bit 0) is a bit that indicates that the channel status is for a consumer use. A 1st bit (bit 1) is a bit that indicates whether it is a linear PCM sample. 6th and 7th bits (bit 6-7) are a field indicating a mode of the channel status.

In a 3rd byte, 0 to 3rd bits (bit 24-27) and 6th and 7th bits (bit 30-31) are each a field indicating a sampling frequency. FIG. 15 shows a current specified state. In the field, there is a reserved area so that a new sampling frequency can be specified as shown in the figure.

Transmission of SPDIF signals including 2-channel audio data is carried out while conforming to the IEC 60958 standard. On the other hand, transmission of SPDIF signals including multichannel audio data (linear PCM) of 5.1 channels, 7.1 channels, 10.2 channels, 22.2 channels, and the like becomes possible by extending the IEC 60958 standard.

The transmission of SPDIF signals including multichannel audio data (linear PCM) will be described. The IEC 60958 standard is in wide use, and the transmission side may start transmission without checking performance on the reception side. Therefore, there is a need to not cause a failure in such a case or even when data in a new format is transmitted to a receiver that has been commercialized in the past. At the very least, there is a need for the receiver to not cause noises. 5.1 is widely used as the number of channels for multichannel audio, and 7.1, 10.2, and 22.2 channels are also expected to be used and to prevail in future broadcasts.

As means for not influencing receivers of the past, there is a use of a transmission frequency that is not currently used. As the transmission frequency, a transmission frequency that is 4 times the sampling frequency specified in the IEC 60958 standard is used. This is for adding auxiliary information, assigning preambles, and carrying out biphase mark modulation on the audio data to be transmitted.

For example, when transmitting 5.1-channel audio data, a 6-channel transmission band only needs to be secured, and a transmission frequency that is 3 times that used in the normal transmission, that is, 2-channel transmission, only needs to be used. For example, when the sampling frequency per channel is 48 kHz, 144 kHz (=48 kHz*3) is newly defined as the sampling frequency, and "Bit 24-27"= "1110b" and "Bit 30-31"="00b", for example, are assigned to the reserved areas of "bit 24-27" and "bit 30-31" of the channel status (see FIG. 14).

Further, for example, when transmitting 10.2-channel audio data, a 12-channel transmission band only needs to be secured, and a transmission frequency that is 6 times that used in the normal transmission, that is, 2-channel transmission, only needs to be used. For example, when the sampling frequency per channel is 48 kHz, 288 kHz (=48 kHz*6) is newly defined as the sampling frequency, and "Bit 24-27"="1110b" and "Bit 30-31"="01b", for example, are assigned to the reserved areas of "bit 24-27" and "bit 30-31" of the channel status (see FIG. 14). It should be noted that when transmitting 7.1-channel audio data, a 12-channel transmission band secured as described above is used, for example.

Further, for example, when transmitting 22.2-channel audio data, a 24-channel transmission band only needs to be secured, and a transmission frequency that is 12 times that used in the normal transmission, that is, 2-channel transmission, only needs to be used. For example, when the sampling frequency per channel is 48 kHz, 576 kHz (=48 kHz*12) is newly defined as the sampling frequency, and "Bit 24-27"="1110b" and "Bit 30-31"="10b", for example, are assigned to the reserved areas of "bit 24-27" and "bit 30-31" of the channel status (see FIG. 14).

FIG. 16(a) shows a correspondence relationship between the number of channels and the sampling frequency in a case where the sampling frequency per channel is 48 kHz. It should be noted that although descriptions will be omitted, also when the sampling frequency per channel is a frequency other than 48 kHz, that is, 44.1 kHz or 32 kHz, for example, sampling frequencies corresponding to the number of channels of 6, 12, and 24 can be newly defined in a similar manner. By newly defining the sampling frequency as described above, pieces of audio data of the respective channels that configure the multichannel audio data included in the SPDIF signals are given a dedicated sampling frequency corresponding to the number of channels. In other words, the number of channels can be recognized by the sampling frequency.

It should be noted that the actual transmission frequency becomes 4 times the sampling frequency as described above. For example, in the case of 6 channels, the transmission frequency becomes 576 kHz (=144 kHz*4). Moreover, as the bit assign method, there is a method of giving a meaning of a pointer of being designated in other areas to "Bit 24-27"="1110b" and "Bit 30-31"="00b" as shown in FIG. 16(b) and writing a value in the area of "Bit 61-66" for identification, for example, in addition to the method shown in FIG. 16(a). By the method shown in FIG. 16(b), a usage of the reserved area of "Bit 30-31" can be suppressed.

The receiver of the past (receiver of related art) does not know a combination of values to be newly assigned to the areas of "bit 24-27" and "bit 30-31" of the channel status as described above. Further, since the transmission frequency (e.g., 576 kHz in case of 6 channels) is new, in the receiver of the past, a PLL is not locked, data cannot be read and an error is eventually caused, audio is muted, and noises are not output. The specified sampling frequency is selected to be an even multiple of 32 kHz, 44.1 kHz, and 48 kHz. If the transmission frequency is an even multiple of these frequencies, there is a possibility that the PLL will be locked (including pseudo lock). However, by selecting a frequency that is an even multiple of 3 times these frequencies as the transmission frequency as described above, it becomes possible to avoid the PLL of the receiver of the past from being erroneously locked.

When transmitting SPDIF signals including multichannel audio data (linear PCM), the transmission band can be secured by defining the sampling frequency as described above, but there is still a need to specify where the multichannels start. Since 2-channel transmission has been used in the IEC 60958 standard, 3 types of preambles B, M, and W have been detected to identify Channels 1 and 2.

Here, also in the case of multichannel transmission of N channels (6 channels, 12 channels, and 24 channels), by setting the channel number so as to start from the preamble B, assigning Channel 1, Channel 2, Channel 3, . . . , and Channel N, and assigning them so that the channel starts from Channel 1 again, the channel number identification on the reception side becomes possible.

Figure 17:
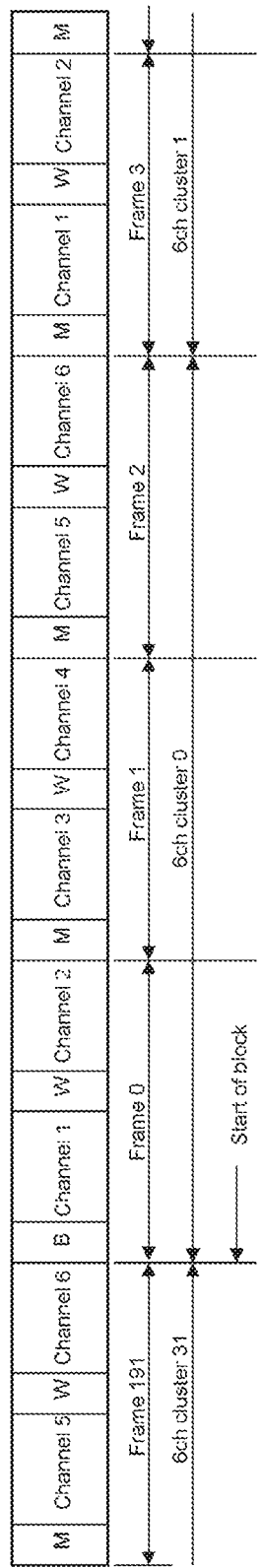
FIG. 17 A diagram showing an example of a frame configuration in a multichannel transmission using 6 channels.

Further, although one block is constituted of 192 frames in the IEC 60958 standard, since 192 is an integral multiple in any of 6 channels, 12 channels, and 24 channels, repetitions thereof do not cause any discrepancies. FIG. 17 shows an example of a frame configuration of the multichannel transmission using 6 channels.

A 6-channel cluster (6ch cluster) is configured every 3 frames. Specifically, 6-channel cluster 0 is configured in Frames 0 to 2, 6-channel cluster 1 is configured in Frames 3 to 5, and repeats after that. Further, in this case, Channels 1 and 2 are assigned to Frame 0, Channels 3 and 4 are assigned to Frame 1, Channels 5 and 6 are assigned to Frame 2, and repeats after that. It should be noted that although not illustrated in the figure, the same holds true for the frame configurations in the multichannel transmissions of 12 channels and 24 channels.

While the channel number identification becomes possible by the assign method described above in the case of the multichannel transmission, there is still a need to designate speaker positions to actually reproduce audio data of the respective channels. In other words, information on a correspondence relationship between the channels and the speaker positions becomes necessary.

In this embodiment, areas for the information that indicates a correspondence relationship between the channels and the speaker positions are provided in the channel status (see FIG. 14). Accordingly, it becomes possible to designate positions of speakers to reproduce audio data of the respective channels in sync with the multichannel audio data.

For example, as shown in FIG. 14, information that indicates the correspondence relationship between the channels and the speaker positions is inserted in the area of "bit 67-74" in the channel status. By using this 8-bit area, 255 combinations of speaker positions can be designated. It should be noted that all-0 is not used in consideration of past compatibility.

FIG. 18 shows an example of values of "bit 67-74" and a correspondence relationship between the channels respectively indicated by those values and the speaker positions. Here, FL, FR, FC, and the like that indicate the speaker positions can be used to identify a maximum of 32 channels by referencing the IEC 60958 standard. Although only up to 24 channels are referred to in the specification, a method of identifying up to 32 channels is exemplified considering extensions in the future. In the example shown in the figure, "-" indicates that while data exists in a data slot, there is no valid data, and the data will not be used for audio reproduction.

Based on the information indicating the correspondence relationship between the channels and the speaker positions, the reception side can supply the audio data of the respective channels to the corresponding speakers. Moreover, based on this information, the reception side can also display what kind of multichannel audio has been transmitted on the display panel for the user to see.

Figure 19A:
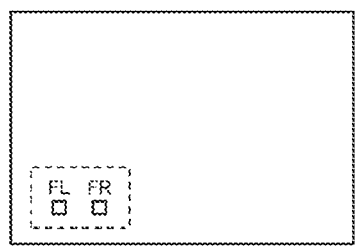
FIGS. 19($a$) and 19($b$) Diagrams each showing an example of UI display on a reception side.
Figure 19B:
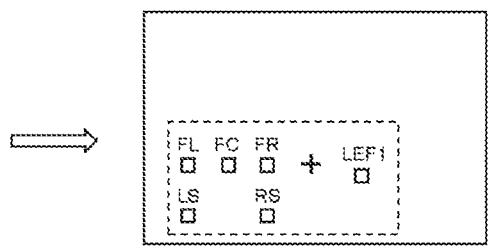

FIGS. 19(a) and (b) each show an example of UI display on the reception side. FIG. 19(a) shows display in a case where a 2-channel transmission is performed, and FIG. 19(b) shows display in a case where the transmission is switched to 5.1 channels, that is, a 6-channel transmission. Although not shown in the figure, similar display is performed also in the case of other multichannel transmissions. In the AV system 10 shown in FIG. 1, the reception side is the audio amplifier 200, and UI display is performed on the display panel 217 (see FIG. 3). It should be noted that similar UI display can also be performed on the transmission side. In the AV system 10 shown in FIG. 1, the transmission side is the television receiver 100, and UI display is performed on the display panel 111 (see FIG. 2).

Further, by providing an area for specifying support information of a new sampling frequency or providing a new descriptor in an audio short descriptor (Audio Short Descriptor) specified in CEA-861, it becomes possible to present performance of the reception side to the transmission side and improve connectivity.

FIG. 20(a) shows a configuration example of the current audio short descriptor (Audio Short Descriptor). FIG. 20(b) shows a configuration example of the audio short descriptor in which areas for specifying support information of new sampling frequencies (576 kHz, 288 kHz, 144 kHz) are newly defined. FIG. 20(c) shows a configuration example of a newly-created multichannel-dedicated descriptor in which areas for specifying support information of new sampling frequencies (576 kHz, 288 kHz, 144 kHz) are provided.

FIG. 21 is a flowchart showing an operational example of the television receiver 100 as the SPDIF signal transmission side. This example is an example that handles 6-channel (5.1-channel) audio data. In Step ST1, the television receiver 100 acquires 6-channel (5.1-channel) audio data and prepares for output.

Next, in Step ST2, the television receiver 100 acquires information on the audio short descriptor of the audio amplifier 200 as the reception side. For example, the television receiver 100 is capable of acquiring the information by communicating with the audio amplifier 200 using the CEC line. In Step ST3, the television receiver 100 determines whether 144 kHz is supported as the sampling frequency on the reception side.

When determined as being supported, the television receiver 100 generates SPDIF signals including 6-channel audio data having a sampling frequency of 144 kHz and transmits the signals to the audio amplifier 200 as the reception side in Step ST4. When determined as not being supported, the television receiver 100 proceeds to processing of Step ST5.

In Step ST5, the television receiver 100 carries out processing of downmixing from 6 channels to 2 channels and acquires 2-channel audio data. Then, in Step ST6, the television receiver 100 generates SPDIF signals including 2-channel audio data having a sampling frequency of 48 kHz and transmits the signals to the audio amplifier 200 as the reception side.

It should be noted that in the operational example shown in the flowchart of FIG. 21, if the reception side supports 144 kHz, the television receiver 100 immediately performs a 6-channel (5.1-channel) output. In this case, however, a 2-channel output is also possible by carrying out the downmix processing. In this regard, in this case, it is also possible to UI-display output mode options so as to prompt the user to select a desired output mode.

FIG. 22(a) shows an example of the UI display in such a case. When the user selects a 6-channel (5.1-channel) output mode, the UI display changes to that shown in FIG. 22(b), and the user can confirm the selection of the output mode.

As described above, in the AV system 10 shown in FIG. 1, the television receiver 100 is capable of transmitting SPDIF signals including multichannel audio data (linear PCM) of 5.1 channels, 7.1 channels, 10.2 channels, 22.2 channels, and the like to the audio amplifier 200.

Also in the AV system 10 shown in FIG. 1, the multichannel audio data included in the SPDIF signals transmitted from the television receiver 100 to the audio amplifier 200 has a sampling frequency corresponding to the number of channels, and information indicating the sampling frequency is added to the audio data to be transmitted. Therefore, the audio amplifier 200 can recognize the number of channels based on the information indicating the sampling frequency and favorably process the reception audio data.

Also in the AV system 10 shown in FIG. 1, information indicating a correspondence relationship between the respective channels and speaker positions is added to the multichannel audio data included in the SPDIF signals transmitted from the television receiver 100 to the audio amplifier 200. Therefore, the audio amplifier 200 can appropriately supply the audio data of the respective channels to the corresponding speakers.

2. Modified Examples

In the embodiment above, the multichannel audio data included in the SPDIF signals are given a dedicated sampling frequency corresponding to the number of channels, and the reception side can recognize the number of channels by the dedicated sampling frequency. However, there may also be a method of defining preambles of a new bit string and changing a preamble sequence so as to enable the number of channels to be recognized.

FIG. 23 shows an example of preambles to be newly defined. A pattern of each preamble is a pattern not having a DC component (number of 0 and number of 1 are the same). For example, the pattern of the preamble "New 1" is "11011000" when the preceding state is "0" and is "00100111" when the preceding state is "1".

Further, for example, the pattern of the preamble "New 2" is "11011010" when the preceding state is "0" and is "00100101" when the preceding state is "1". Further, for example, the pattern of the preamble "New 3" is "11011100" when the preceding state is "0" and is "00101011" when the preceding state is "1".

Figure 24:
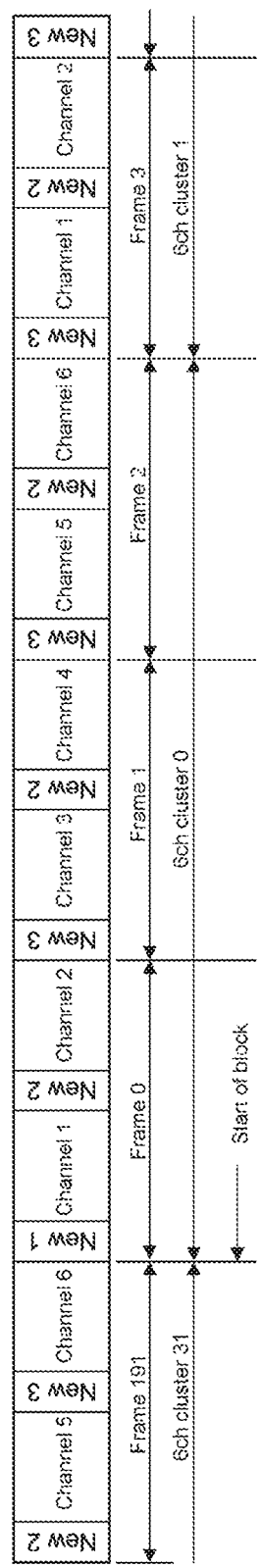
FIG. 24 A diagram showing an example of a frame configuration in a multichannel transmission of 6 channels in a case where preambles to be newly defined are used as the preambles in place of preambles "B", "M", and "W".

FIG. 24 shows an example of a frame configuration in the 6-channel multichannel transmission in a case where preambles to be newly defined are used as the preambles in place of the preambles "B", "M", and "W".

A 6-channel cluster (6ch cluster) is configured every 3 frames. Specifically, 6-channel cluster 0 is configured in Frames 0 to 2, 6-channel cluster 1 is configured in Frames 3 to 5, and repeats after that. In this case, Channels 1 and 2 are assigned to Frame 0, Channels 3 and 4 are assigned to Frame 1, Channels 5 and 6 are assigned to Frame 2, and repeats after that.

In the first Channel 1 of the block, a preamble "New 1" is used, and "New 2" and "New 3" are alternately used for subsequent channels. In this case, the fact that the number of channels is 6 can be easily recognized by the preamble sequence. In this case, cluster boundaries can be identified by successively counting the channels from the start of the block, and thus 6-channel clusters each constituted of Channels 1 to 6 can be grasped.

It should be noted that although not shown in the figure, it is possible to recognize the number of channels on the reception side by similarly changing the preamble sequence regarding the frame configuration in multichannel transmissions of 12 channels and 24 channels.

Further, although not shown in the figure, it is also possible to additionally define "New 4" and use the preamble "New 4" for the first Channel 1 of each of the 6-channel clusters while excluding the first Channel 1 of the block. In this case, the preamble "New 1" or "New 4" is used for Channel 1 at the head of each 6-channel cluster. Therefore, the reception side can identify the cluster boundaries by the preamble "New 1" or "New 4" and easily grasp the 6-channel clusters each constituted of Channels 1 to 6.

Figure 25:
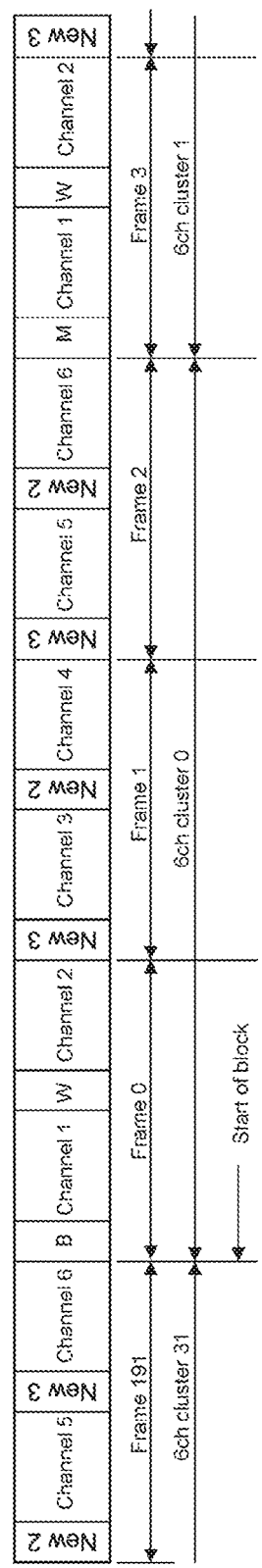
FIG. 25 A diagram showing another example of a frame configuration in the multichannel transmission of 6 channels in a case where preambles to be newly defined are used.

Since receivers of the past (receiver of related art) are incapable of detecting newly-defined preambles, audio reproduction is muted, and a failure in which noises are output or the like does not occur. It should be noted that it is also possible to follow the existing way regarding first Channels 1 and 2 and assign newly-defined preambles to only the subsequent channels for identification. FIG. 25 shows an example of the frame configuration in the multichannel transmission of 6 channels in this case.

In this case, the preamble "B" or "M" ("B" is used only at head of block) is used in Channel 1, the preamble "W" is used in Channel 2, the preamble "New 3" is used in Channel 3, the preamble "New 2" is used in Channel 4, the preamble "New 3" is used in Channel 5, and the preamble "New 2" is used in Channel 6. In this case, the preamble "B" or "M" is used for Channel 1 at the head of each of the 6-channel clusters. Therefore, the reception side can easily grasp the 6-channel clusters each constituted of Channels 1 to 6.

When enabling the reception side to recognize the number of channels by changing the preamble sequence as described above, there is no need to use a dedicated sampling frequency corresponding to the number of channels. In other words, multichannel audio data transmissions can also be performed using the sampling frequency defined in the past. For example, while 176.4 kHz is used as the sampling frequency, a multichannel transmission of 8 channels instead of 2 channels also becomes possible.

Further, the embodiment above has shown the example of using the HDMI ARC for transmitting SPDIF signals from the television receiver 100 to the audio amplifier 200, that is, the example where the HDMI ARC is used as the IEC 60958 transmission channel. The present technology is similarly applicable to an example where a coaxial cable or an optical cable is used as the IEC 60958 transmission channel.

Figure 26:
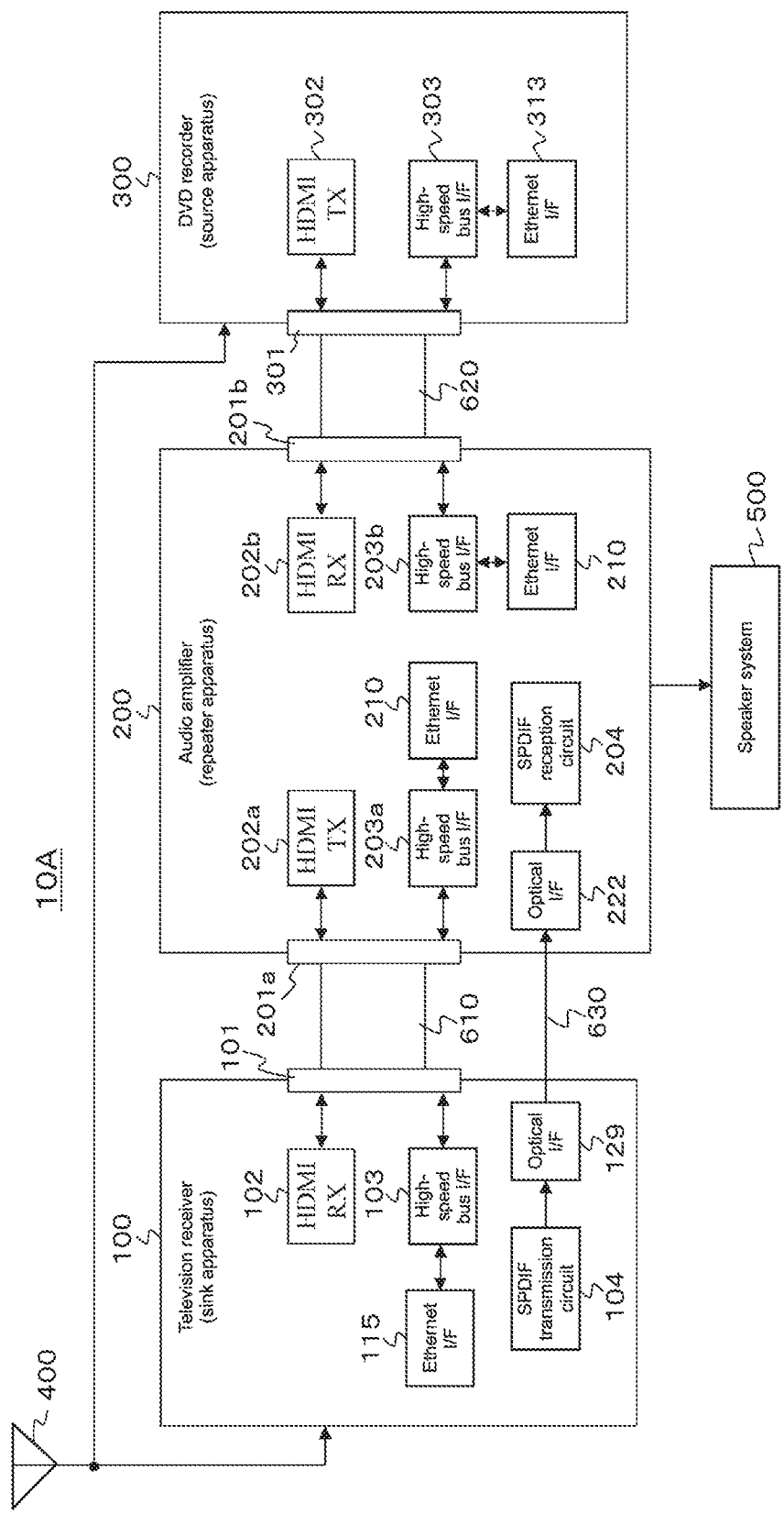
FIG. 26 A block diagram showing a configuration example of the AV system in a case where an optical cable is used as an IEC 60958 transmission channel.

FIG. 26 shows a configuration example of an AV system 10A in a case where an optical cable is used as the IEC 60958 transmission channel. In FIG. 26, parts corresponding to those of FIG. 1 are denoted by the same symbols, and detailed descriptions thereof will be omitted. In the AV system 10A, the television receiver 100 includes an optical interface 129, and the audio amplifier 200 includes an optical interface 222. In addition, SPDIF signals output from the SPDIF transmission circuit 104 of the television receiver 100 are transmitted to the SPDIF reception circuit 204 of the audio amplifier 200 via the optical interface 129, an optical cable 630, and the optical interface 222.

It should be noted that the example of using the HDMI ARC as the IEC 60958 transmission channel (see FIG. 1) and the example of using a coaxial cable or optical cable as the IEC 60958 transmission channel (see FIG. 26) have been described above.

Figure 27A:
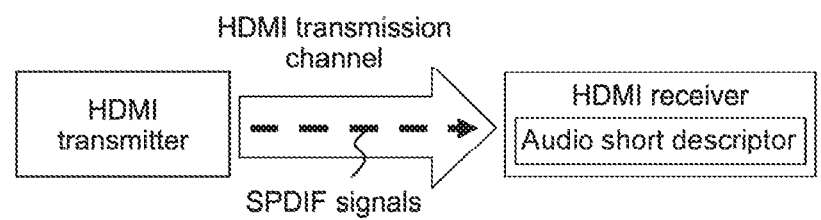
FIGS. 27($a$) and 27($b$) Diagrams respectively showing examples where an HDMI transmission channel and a display port transmission channel are used as the EC 60958 transmission channel.
Figure 27B:
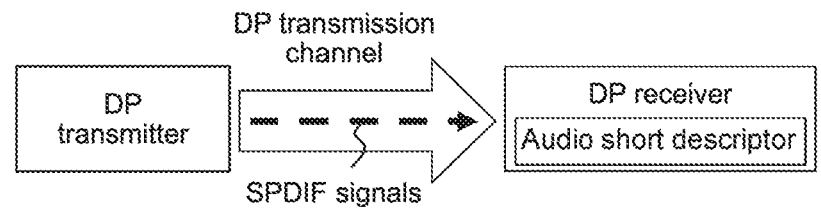

In addition, an example of using an HDMI transmission channel as the IEC 60958 transmission channel as shown in FIG. 27(*a*) is also possible. In this case, SPDIF signals (IEC 60958 signals) are mapped to an audio sample packet (audio sample packet) and transmitted in the same forward direction as a video transmission. An audio short descriptor (Audio short descriptor) in the HDMI receiver is read by the HDMI transmitter via a DDC line in the HDMI transmission channel. Similarly, an example of using a display port transmission channel (DP transmission channel) as the IEC 60958 transmission channel as shown in FIG. 27(*b*) is also possible. Also in this case, SPDIF signals (IEC 60958 signals) are mapped to an audio sample packet (audio sample packet) and transmitted in the same forward direction as the video transmission.

Furthermore, the present technology may also take the following configurations.

(1) A transmission apparatus, including:
 a data acquisition unit that acquires multichannel audio data of a predetermined number of channels,
  the multichannel audio data having a sampling frequency corresponding to the predetermined number of channels;
 a data transmission unit that sequentially transmits audio data of the respective channels configuring the multichannel audio data to a reception side via a predetermined transmission channel for each unit audio data; and
 an information addition unit that adds information indicating the sampling frequency to the audio data transmitted by the data transmission unit.

(2) The transmission apparatus according to (1), in which
 the predetermined number of channels is 6, 12, or 24.

(3) The transmission apparatus according to (1) or (2), in which
 the information addition unit further adds information indicating a correspondence relationship between the respective channels and speaker positions to the audio data transmitted by the data transmission unit.

(4) The transmission apparatus according to any one of (1) to (3), further including
 an information acquisition unit that acquires information on a sampling frequency supported by the reception side,
 in which the data transmission unit transmits the multichannel audio data of the predetermined number of channels to the reception side when the sampling frequency corresponding to the predetermined number of channels is supported by the reception side.

(5) The transmission apparatus according to any one of (1) to (4), in which
 the predetermined transmission channel is a coaxial cable, an optical cable, an HDMI cable, or a display port cable.

(6) The transmission apparatus according to any one of (1) to (5), further including
 a user interface unit that displays a channel configuration of the multichannel audio data transmitted by the data transmission unit.

(7) A transmission method, including the steps of:
acquiring multichannel audio data of a predetermined number of channels,
the multichannel audio data having a sampling frequency corresponding to the predetermined number of channels;
sequentially transmitting audio data of the respective channels configuring the multichannel audio data to a reception side via a predetermined transmission channel for each unit audio data; and
adding information indicating the sampling frequency to the audio data transmitted in the data transmission step.

(8) A reception apparatus, including:
a data reception unit that sequentially receives audio data of respective channels configuring multichannel audio data of a predetermined number of channels from a transmission side via a predetermined transmission channel for each unit audio data;
the multichannel audio data having a sampling frequency corresponding to the predetermined number of channels,
the audio data received by the data reception unit having information indicating the sampling frequency added thereto; and
a processing unit that recognizes the predetermined number of channels based on the information indicating the sampling frequency and processes the audio data received by the data reception unit.

(9) The reception apparatus according to (8), in which
the predetermined number of channels is 6, 12, or 24.

(10) The reception apparatus according to (8) or (9), in which
the audio data received by the data reception unit further has information indicating a correspondence relationship between the respective channels and speaker positions added thereto, and
the processing unit supplies the audio data of the respective channels to corresponding speakers based on the information indicating the correspondence relationship.

(11) The reception apparatus according to any one of (8) to (10), further including
an information transmission unit that transmits information on a supporting sampling frequency to the transmission side.

(12) The reception apparatus according to any one of (8) to (11), in which
the predetermined transmission channel is a coaxial cable, an optical cable, an HDMI cable, or a display port cable.

(13) The reception apparatus according to any one of (8) to (12), further including
a user interface unit that displays a channel configuration of the multichannel audio data received by the data reception unit.

(14) A reception method, including the steps of:
sequentially receiving, by a data reception unit, audio data of respective channels configuring multichannel audio data of a predetermined number of channels from a transmission side via a predetermined transmission channel for each unit audio data;
the multichannel audio data having a sampling frequency corresponding to the predetermined number of channels,
the audio data received in the data reception step having information indicating the sampling frequency added thereto; and
recognizing the predetermined number of channels based on the information indicating the sampling frequency and processing the audio data received in the data reception step.

(15) A transmission apparatus, including:
a data acquisition unit that acquires multichannel audio data of a predetermined number of channels; and
a data transmission unit that sequentially transmits audio data of the respective channels to a reception side via a predetermined transmission channel in a state where a preamble is added thereto for each unit audio data,
a pattern of the preamble added to a head unit audio data out of consecutive unit audio data pieces of the predetermined number of channels being a specific pattern indicating a head position.

(16) The transmission apparatus according to (15), further including
an information addition unit that adds information indicating a correspondence relationship between the respective channels and speaker positions to the audio data transmitted by the data transmission unit.

(17) A transmission method, including the steps of:
acquiring multichannel audio data of a predetermined number of channels; and
sequentially transmitting, by a data transmission unit, audio data of the respective channels to a reception side via a predetermined transmission channel in a state where a preamble is added thereto for each unit audio data,
a pattern of the preamble added to a head unit audio data out of consecutive unit audio data pieces of the predetermined number of channels being a specific pattern indicating a head position.

(18) A reception apparatus, including:
a data reception unit that sequentially receives audio data of respective channels configuring multichannel audio data of a predetermined number of channels from a transmission side via a predetermined transmission channel in a state where a preamble is added thereto for each unit audio data,
a pattern of the preamble added to a head unit audio data out of consecutive unit audio data pieces of the predetermined number of channels being a specific pattern indicating a head position; and
a processing unit that recognizes the predetermined number of channels based on the pattern of the preamble added to the unit audio data sequentially received by the data reception unit and processes the audio data received by the data reception unit.

(19) The reception apparatus according to (18), in which
the audio data received by the data reception unit further has information indicating a correspondence relationship between the respective channels and speaker positions added thereto, and
the processing unit supplies the audio data of the respective channels to corresponding speakers based on the information indicating the correspondence relationship.

(20) A reception method, including the steps of:
sequentially receiving, by a reception unit, audio data of respective channels configuring multichannel audio data of a predetermined number of channels from a transmission side via a predetermined transmission channel in a state where a preamble is added thereto for each unit audio data,
a pattern of the preamble added to a head unit audio data out of consecutive unit audio data pieces of the predetermined number of channels being a specific pattern indicating a head position; and
recognizing the predetermined number of channels based on the pattern of the preamble added to the unit audio data sequentially received in the data reception step and processing the audio data received in the data reception step.

REFERENCE SIGNS LIST

10 AV system
100 television receiver
101 HDMI terminal
102 HDMI reception unit
103 high-speed bus interface
104 SPDIF transmission circuit
105 antenna terminal
106 digital tuner
107 MPEG decoder
108 video signal processing circuit
109 graphic generation circuit
110 panel drive circuit
111 display panel
112 audio signal processing circuit
113 audio amplification circuit
114 speaker
115 Ethernet interface
116 network terminal
120 internal bus
121 CPU
122 flash ROM
123 DRAM
124 display control unit
125 remote control reception unit
126 remote control transmitter
127 power supply unit
128 plug connection transmission circuit
200 audio amplifier
201a, 201b HDMI terminal
202a HDMI transmission unit
202b HDMI reception unit
203a, 203b high-speed bus interface
204 SPDIF reception circuit
205 MPEG decoder
206 video/graphic processing circuit
207 audio processing circuit
208 audio amplification circuit
209 audio output terminal
210 Ethernet interface
211 internal bus
212 CPU
213 flash ROM
214 DRAM
215 display control unit
216 panel drive circuit
217 display panel
218 power supply unit
219 remote control reception unit
220 remote control transmitter
221 plug connection detection circuit
300 BD player
301 HDMI terminal
302 HDMI transmission unit
303 high-speed bus interface
304 internal bus
305 CPU
306 flash ROM
307 SDRAM
308 display control unit
309 remote control reception unit
310 remote control transmitter
311 storage medium control interface
312a BD drive
312b HDD
312c SDD
313 Ethernet interface
314 network terminal
315 MPEG decoder
316 graphic generation circuit
317 video output terminal
318 audio output terminal
319 panel drive circuit
320 display panel
321 power supply unit
400 reception antenna
500 speaker system
610, 620 HDMI cable
630 optical cable

The invention claimed is:

1. A transmission apparatus, comprising:
a central processing unit (CPU) configured to:
acquire multichannel audio data of a specific number of channels,
wherein the specific number of channels is one of 6, 12, or 24;
determine a sampling frequency for the multichannel audio data based on a product of a specific value and a sampling frequency per channel,
wherein the specific value and the sampling frequency for the multichannel audio data correspond to the specific number of channels;
acquire first information from a reception apparatus,
wherein the first information is associated with sampling frequencies supported by the reception apparatus;
determine, based on the acquired first information, the sampling frequency for the multichannel audio data is one of supported or unsupported by the reception apparatus;
sequentially transmit, based on the determination that the sampling frequency for the multichannel audio data is supported by the reception apparatus, the multichannel audio data of the specific number of channels to the reception apparatus via a specific transmission channel,
wherein the multichannel audio data includes second information that indicates the sampling frequency for the multichannel audio data;
downmix, based on the determination that the sampling frequency for the multichannel audio data is unsupported by the reception apparatus, the multichannel audio data to a 2-channel audio data;
sequentially transmit the 2-channel audio data to the reception apparatus; and
control a display screen to display a first output mode option that corresponds to the multichannel audio data and a second output mode option that corresponds to the 2-channel audio data.

2. The transmission apparatus according to claim 1, wherein the multichannel audio data further includes third information that indicates a correspondence relationship between the specific number of channels and corresponding speaker positions.

3. The transmission apparatus according to claim 1, wherein the specific transmission channel is one of a coaxial cable, an optical cable, an HDMI cable, or a display port cable.

4. The transmission apparatus according to claim 1, further comprising the display screen, wherein the CPU is further configured to control the display screen to display a channel configuration of the multichannel audio data of the specific number of channels.

5. A transmission method, comprising:
  in a transmission apparatus:
    acquiring multichannel audio data of a specific number of channels,
      wherein the specific number of channels is one of 6, 12, or 24;
    determining a sampling frequency for the multichannel audio data based on a product of a specific value and a sampling frequency per channel,
      wherein the specific value and the sampling frequency for the multichannel audio data correspond to the specific number of channels;
    acquiring first information from a reception apparatus,
      wherein the first information is associated with sampling frequencies supported by the reception apparatus;
    determining, based on the acquired first information, the sampling frequency for the multichannel audio data is one of supported or unsupported by the reception apparatus;
    sequentially transmitting, based on the determination that the sampling frequency for the multichannel audio data is supported by the reception apparatus, the multichannel audio data of the specific number of channels to the reception apparatus via a specific transmission channel,
      wherein the multichannel audio data includes second information that indicates the sampling frequency for the multichannel audio data;
    downmixing, based on the determination that the sampling frequency for the multichannel audio data is unsupported by the reception apparatus, the multichannel audio data to a 2-channel audio data;
    sequentially transmitting the 2-channel audio data to the reception apparatus; and
    controlling a display screen to display a first output mode option that corresponds to the multichannel audio data and a second output mode option that corresponds to the 2-channel audio data.

6. A reception apparatus, comprising:
  a central processing unit (CPU) configured to:
    transmit first information to a transmission apparatus, wherein
      the first information is associated with sampling frequencies supported by the reception apparatus, and
      the transmission apparatus determines, based on the transmitted first information, a sampling frequency for multichannel audio data corresponding to a specific number of channels is one of supported or unsupported by the reception apparatus;
    sequentially receive, based on the determination that the sampling frequency for the multichannel audio data is supported by the reception apparatus, the multichannel audio data of the specific number of channels from the transmission apparatus via a specific transmission channel, wherein
      the specific number of channels is one of 6, 12, or 24,
      the multichannel audio data includes second information that indicates the sampling frequency for the multichannel audio data,
      the transmission apparatus determines the sampling frequency for the multichannel audio data based on a product of a specific value and a sampling frequency per channel,
      the specific value corresponds to the specific number of channels,
      the transmission apparatus downmixes, based on the determination that the sampling frequency for the multichannel audio data is unsupported by the reception apparatus, the multichannel audio data to a 2-channel audio data, and
      the transmission apparatus controls a display screen to display a first output mode option that corresponds to the multichannel audio data and a second output mode option that corresponds to the 2-channel audio data;
    sequentially receive the 2-channel audio data from the transmission apparatus;
    recognize one of the specific number of channels or 2-channels of the 2-channel audio data based on the second information; and
    process one of the multichannel audio data or the 2-channel audio data based on the recognition.

7. The reception apparatus according to claim 6, wherein the multichannel audio data further includes third information that indicates a correspondence relationship between the specific number of channels and corresponding speaker positions, and
  the CPU is further configured to supply the multichannel audio data of the specific number of channels to corresponding speakers based on the third information.

8. The reception apparatus according to claim 6, wherein the specific transmission channel is one of a coaxial cable, an optical cable, an HDMI cable, or a display port cable.

9. The reception apparatus according to claim 6, further comprising the display screen, wherein the CPU is further configured to control the display screen to display a channel configuration of the multichannel audio data of the specific number of channels.

10. A reception method, comprising:
  in a reception apparatus:
    transmitting first information to a transmission apparatus, wherein
      the first information is associated with sampling frequencies supported by the reception apparatus, and
      the transmission apparatus determines, based on the transmitted first information, a sampling frequency for multichannel audio data corresponding to a specific number of channels is one of supported or unsupported by the reception apparatus;
    sequentially receiving, based on the determination that the sampling frequency for the multichannel audio data is supported by the reception apparatus, the multichannel audio data of the specific number of channels from the transmission apparatus via a specific transmission channel, wherein
      the specific number of channels is one of 6, 12, or 24,
      the multichannel audio data includes second information that indicates the sampling frequency for the multichannel audio data,
      the transmission apparatus determines the sampling frequency for the multichannel audio data based on a product of a specific value and a sampling frequency per channel,
      the specific value corresponds to the specific number of channels, the transmission apparatus downmixes, based on the determination that the sampling frequency for the multichannel audio data is unsupported by the reception apparatus, the multichannel audio data to a 2-channel audio data, and the transmission apparatus controls a display screen to display a first output mode option that corresponds to the multichannel audio data and a second output mode option that corresponds to the 2-channel audio data;

sequentially receiving the 2-channel audio data from the transmission apparatus;

recognizing one of the specific number of channels or 2-channels of the 2- channel audio data based on the second information; and processing one of the multichannel audio data or the 2-channel audio data based on the recognition.

11. A transmission apparatus, comprising:
a central processing unit (CPU) configured to:
acquire multichannel audio data of a specific number of channels,
wherein the specific number of channels is one of 6, 12, or 24;
determine a sampling frequency for the multichannel audio data based on a product of a specific value and a sampling frequency per channel,
wherein the specific value and the sampling frequency for the multichannel audio data correspond to the specific number of channels;
acquire first information from a reception apparatus,
wherein the first information is associated with sampling frequencies supported by the reception apparatus;
determine, based on the acquired first information, the sampling frequency for the multichannel audio data is one of supported or unsupported by the reception apparatus;
sequentially transmit, based on the determination that the sampling frequency for the multichannel audio data is supported by the reception apparatus, the multichannel audio data of the specific number of channels to the reception apparatus via a specific transmission channel,
wherein the multichannel audio data includes second information that indicates the sampling frequency for the multichannel audio data;
downmix, based on the determination that the sampling frequency for the multichannel audio data is unsupported by the reception apparatus, the multichannel audio data to a 2-channel audio data;
sequentially transmit the 2-channel audio data to the reception apparatus;
control a display screen to display a first output mode option that corresponds to the multichannel audio data and a second output mode option that corresponds to the 2-channel audio data;
assign a preamble for one of the multichannel audio data of the specific number of channels or the 2-channel audio data; and
add a specific pattern of the preamble at a head block of the one of the multichannel audio data of the specific number of channels or the 2-channel audio data, wherein
the specific pattern indicates a head position corresponding to the one of the multichannel audio data of the specific number of channels or the 2-channel audio data, and
the one of the multichannel audio data of the specific number of channels or the 2-channel audio data is sequentially transmitted to the reception apparatus via the specific transmission channel in a state associated with the assigned preamble.

12. The transmission apparatus according to claim 11, wherein the multichannel audio data includes third information that indicates a correspondence relationship between the specific number of channels and corresponding speaker positions.

13. A transmission method, comprising:
in a transmission apparatus:
acquiring multichannel audio data of a specific number of channels,
wherein the specific number of channels is one of 6, 12, or 24;
determining a sampling frequency for the multichannel audio data based on a product of a specific value and a sampling frequency per channel,
wherein the specific value and the sampling frequency for the multichannel audio data correspond to the specific number of channels;
acquiring first information from a reception apparatus,
wherein the first information is associated with sampling frequencies supported by the reception apparatus;
determining, based on the acquired first information, the sampling frequency for the multichannel audio data is one of supported or unsupported by the reception apparatus;
sequentially transmitting, based on the determination that the sampling frequency for the multichannel audio data is supported by the reception apparatus, the multichannel audio data of the specific number of channels to the reception apparatus via a specific transmission channel,
wherein the multichannel audio data includes second information that indicates the sampling frequency for the multichannel audio data;
downmixing, based on the determination that the sampling frequency for the multichannel audio data is unsupported by the reception apparatus, the multichannel audio data to a 2-channel audio data;
sequentially transmitting the 2-channel audio data to the reception apparatus;
controlling a display screen to display a first output mode option that corresponds to the multichannel audio data and a second output mode option that corresponds to the 2-channel audio data;
assigning a preamble for one of the multichannel audio data of the specific number of channels or the 2-channel audio data; and
adding a specific pattern of the preamble at a head block of the one of the multichannel audio data of the specific number of channels or the 2-channel audio data, wherein
the specific pattern indicates a head position corresponding to the one of the multichannel audio data of the specific number of channels or the 2-channel audio data, and
the one of the multichannel audio data of the specific number of channels or the 2-channel audio data is sequentially transmitted to the reception apparatus via the specific transmission channel in a state associated with the assigned preamble.

14. A reception apparatus, comprising:
a central processing unit (CPU) configured to:
   transmit first information to a transmission apparatus, wherein
      the first information is associated with sampling frequencies supported by the reception apparatus, and
      the transmission apparatus determines, based on the transmitted first information, a sampling frequency for multichannel audio data corresponding to a specific number of channels is one of supported or unsupported by the reception apparatus;
   sequentially receive, based on the determination that the sampling frequency for the multichannel audio data is supported by the reception apparatus, the multichannel audio data of the specific number of channels from the transmission apparatus via a specific transmission channel, wherein
      the specific number of channels is one of 6, 12, or 24,
      the multichannel audio data includes second information that indicates the sampling frequency for the multichannel audio data,
      the transmission apparatus determines the sampling frequency for the multichannel audio data based on a product of a specific value and a sampling frequency per channel,
      the specific value corresponds to the specific number of channels, and
      the transmission apparatus downmixes, based on the determination that the sampling frequency for the multichannel audio data is unsupported by the reception apparatus, the multichannel audio data to a 2-channel audio data;
   sequentially receive the 2-channel audio data from the transmission apparatus, wherein
      the transmission apparatus controls a display screen to display a first output mode option that corresponds to the multichannel audio data and a second output mode option that corresponds to the 2-channel audio data,
      the transmission apparatus assigns a preamble for one of the multichannel audio data of the specific number of channels or the 2-channel audio data,
      the transmission apparatus adds a specific pattern of the preamble at a head block of the one of the multichannel audio data of the specific number of channels or the 2-channel audio data, and
      the specific pattern indicates a head position corresponding to the one of the multichannel audio data of the specific number of channels or the 2-channel audio data;
   recognize one of the specific number of channels or 2-channels of the 2-channel audio data based on the specific pattern of the preamble; and
   process the one of the multichannel audio data or the 2-channel audio data based on the recognition.

15. The reception apparatus according to claim 14, wherein the multichannel audio data further includes third information that indicates a correspondence relationship between the specific number of channels and corresponding speaker positions, and
the CPU is further configured to supply the multichannel audio data of the specific number of channels to corresponding speakers based on the third information.

16. A reception method, comprising:
in a reception apparatus:
   transmitting first information to a transmission apparatus, wherein
      the first information is associated with sampling frequencies supported by the reception apparatus, and
      the transmission apparatus determines, based on the transmitted first information, a sampling frequency for multichannel audio data corresponding to a specific number of channels is one of supported or unsupported by the reception apparatus;
   sequentially receiving, based on the determination that the sampling frequency for the multichannel audio data is supported by the reception apparatus, the multichannel audio data of the specific number of channels from the transmission apparatus via a specific transmission channel, wherein
      the specific number of channels is one of 6, 12, or 24,
      the multichannel audio data includes second information that indicates the sampling frequency for the multichannel audio data,
      the transmission apparatus determines the sampling frequency for the multichannel audio data based on a product of a specific value and a sampling frequency per channel,
      the specific value corresponds to the specific number of channels, and
      the transmission apparatus downmixes, based on the determination that the sampling frequency for the multichannel audio data is unsupported by the reception apparatus, the multichannel audio data to a 2-channel audio data;
   sequentially receiving the 2-channel audio data from the transmission apparatus, wherein
      the transmission apparatus controls a display screen to display a first output mode option that corresponds to the multichannel audio data and a second output mode option that corresponds to the 2-channel audio data,
      the transmission apparatus assigns a preamble for one of the multichannel audio data of the specific number of channels or the 2-channel audio data,
      the transmission apparatus adds specific pattern of the preamble at a head block of the one of the multichannel audio data of the specific number of channels or the 2-channel audio data, and
      the specific pattern indicates a head position corresponding to the one of the multichannel audio data of the specific number of channels or the 2-channel audio data;
   recognizing one of the specific number of channels or 2-channels of the 2-channel audio data based on the specific pattern of the preamble; and
   processing the one of the multichannel audio data or the 2-channel audio data based on the recognition.

* * * * *